US012676712B2

(12) United States Patent
Mozaffari et al.

(10) Patent No.: US 12,676,712 B2
(45) Date of Patent: Jul. 7, 2026

(54) EFFICIENT RESOURCE RESERVATION FOR LTE-M AND NB-IOT

(71) Applicant: Telefonaktiebolaget LM Ericsson (PUBL), Stockholm (SE)

(72) Inventors: Mohammad Mozaffari, Fremont, CA (US); Johan Bergman, Stockholm (SE); Anders Wallén, Ystad (SE); Mattias Frenne, Uppsala (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 0 days.

(21) Appl. No.: 17/765,689

(22) PCT Filed: Oct. 9, 2020

(86) PCT No.: PCT/CN2020/119981
§ 371 (c)(1),
(2) Date: Mar. 31, 2022

(87) PCT Pub. No.: WO2021/063422
PCT Pub. Date: Apr. 8, 2021

(65) Prior Publication Data
US 2022/0345270 A1 Oct. 27, 2022

(51) Int. Cl.
*H04L 5/00* (2006.01)
*H04L 27/26* (2006.01)
(52) U.S. Cl.
CPC ...... *H04L 5/0048* (2013.01); *H04L 27/26025* (2021.01)
(58) Field of Classification Search
CPC ..... H04L 5/0005; H04L 5/0053; H04L 5/003; H04L 5/007; H04L 5/0048; H04L 5/0094;
(Continued)

(56) References Cited

U.S. PATENT DOCUMENTS 8,787,245 B2 * 7/2014 Seo ........................ H04L 5/0005
370/341
2009/0262699 A1 * 10/2009 Wengerter ............ H04L 1/1812
370/330
(Continued)

FOREIGN PATENT DOCUMENTS

CN 108811139 A 11/2018
CN 110049561 A * 7/2019 ........... H04L 5/0053
(Continued)

OTHER PUBLICATIONS

3GPP TSG RAN WG1 Meeting 91; Reno, USA; Source: LG Electronics; Title: Remaining issues on rate matching resources (R1-1719937)—Nov. 27-Dec. 1, 2017.
(Continued)

*Primary Examiner* — Jean A Gelin
(74) *Attorney, Agent, or Firm* — Baker Botts L.L.P.

(57) ABSTRACT

There is provided network node (110, 550) for handling communication of wireless devices (121, 650) in a wireless communication network (100). The network node comprises processing circuitry (551) configured to send a first configuration message to a wireless device, wherein the first configuration message comprises a resource reservation scheme. The resource reservation scheme comprises at least one bitmap indicating at least one reserved resource, wherein the at least one bitmap indicates reserved resources within a subframe, and wherein resources carrying a predefined reference signal have been excluded from the bitmap. There is also provided a corresponding wireless device (121, 650) for communicating with a network node (110, 550) in a wireless communication network (100), and corresponding methods performed by a network node and a wireless device.

22 Claims, 15 Drawing Sheets

(58) Field of Classification Search
CPC .. H04L 27/26025; H04W 4/70; H04W 28/26;
H04W 28/0236; H04W 72/0446; H04W
72/0453; H04W 72/541; H04W 72/542
See application file for complete search history.

(56) References Cited

U.S. PATENT DOCUMENTS

| | | | | |
|---|---|---|---|---|
| 2013/0107828 | A1 | 5/2013 | Dinan | |
| 2013/0114496 | A1* | 5/2013 | Mazzarese | H04H 20/57 |
| | | | | 370/312 |
| 2014/0204853 | A1* | 7/2014 | Ko | H04L 5/0035 |
| | | | | 370/329 |
| 2015/0049699 | A1* | 2/2015 | Takeda | H04W 72/542 |
| | | | | 370/329 |
| 2015/0373694 | A1* | 12/2015 | You | H04L 5/0051 |
| | | | | 370/329 |
| 2017/0150367 | A1* | 5/2017 | Han | H04L 27/0006 |
| 2017/0201898 | A1* | 7/2017 | Park | H04W 16/32 |
| 2017/0215096 | A1* | 7/2017 | Moon | H04L 5/14 |
| 2017/0315844 | A1* | 11/2017 | Ji | G06F 9/50 |
| 2018/0035438 | A1* | 2/2018 | Pao | H04W 72/21 |
| 2018/0097673 | A1* | 4/2018 | Nangia | H04L 5/001 |
| 2018/0098322 | A1* | 4/2018 | Yoon | H04W 56/0005 |
| 2018/0176895 | A1* | 6/2018 | Dinan | H04W 72/0446 |
| 2018/0176935 | A1* | 6/2018 | Li | H04W 72/23 |
| 2019/0081821 | A1* | 3/2019 | Bendlin | H04L 12/40156 |
| 2019/0116592 | A1* | 4/2019 | Moon | H04L 5/0092 |
| 2019/0150155 | A1* | 5/2019 | Chatterjee | H04L 1/004 |
| | | | | 370/335 |
| 2019/0335531 | A1* | 10/2019 | Wang | H04W 40/005 |
| 2019/0342867 | A1* | 11/2019 | Lin | H04L 1/0013 |
| 2019/0349998 | A1* | 11/2019 | Bhattad | H04L 1/0013 |
| 2020/0022089 | A1* | 1/2020 | Guo | H04W 52/242 |
| 2020/0107303 | A1* | 4/2020 | Hahn | H04W 72/0446 |
| 2020/0205159 | A1* | 6/2020 | Tang | H04W 72/0446 |
| 2020/0280511 | A1* | 9/2020 | Gapin | H04L 67/141 |
| 2020/0280999 | A1* | 9/2020 | Guo | H04W 72/542 |
| 2021/0058905 | A1* | 2/2021 | Ganesan | H04L 5/0014 |
| 2021/0227522 | A1* | 7/2021 | Lin | H04L 27/2607 |
| 2021/0289474 | A1* | 9/2021 | Wang | H04L 5/0044 |
| 2021/0314919 | A1* | 10/2021 | Kwak | H04W 72/0446 |
| 2021/0336756 | A1* | 10/2021 | Chae | H04L 1/1614 |
| 2021/0376888 | A1* | 12/2021 | Cao | H04L 5/0048 |
| 2021/0385710 | A1* | 12/2021 | Jin | H04W 48/12 |
| 2021/0391964 | A1* | 12/2021 | Kwak | H04B 7/0456 |
| 2022/0191081 | A1* | 6/2022 | Kim | H04B 1/7156 |
| 2022/0272583 | A1* | 8/2022 | Mozaffari | H04W 72/0446 |

FOREIGN PATENT DOCUMENTS

| | | | | | |
|---|---|---|---|---|---|
| CN | 118785259 | A | * 10/2024 | | H04W 88/06 |
| EP | 3 499 994 | A1 | 6/2019 | | |
| JP | 7004739 | B2 | * 1/2022 | | H04W 16/14 |
| RU | 2748889 | C2 | * 6/2021 | | H04W 88/10 |
| WO | 2018 119851 | A1 | 7/2018 | | |
| WO | WO2018178309 | A1 | 10/2018 | | |
| WO | WO2019159108 | A1 | 8/2019 | | |
| WO | 2021 029817 | A1 | 2/2021 | | |

OTHER PUBLICATIONS

3GPP TSG RAN Meeting #84; Newport Beach, USA; Source: Ericsson; Title: Revised WID: Additional MTC enhancements for LTE (RP-191356 (revision of RP-190770))—Jun. 3-6, 2019.

3GPP TSG RAN meeting #85; Newport Beach, USA; Source: Futurewei; Title: WID Revision: Additional Enhancements for NB-IOT (RP-192313 (revision of RP-191867))—Sep. 16-20, 2019.

PCT International Search Report issued for International application No. PCT/CN2020/119981—Dec. 31, 2020.

PCT Written Opinion of the International Searching Authority issued for International application No. PCT/CN2020/119981—Dec. 31, 2020.

3GPP TSG RAN WG1 Meeting #98; Prague, CZ, Aug. 26-30, 2019; Agenda Item: 6.2.1.4; Source: Ericsson; Title: Coexistence of LTE-MTC with NR (R1-1908021).

Extended European Search Report issued for Application No. Patent No. 20872259.5-1213 / 4038950 PCT/CN2020119981—Sep. 26, 2023.

3GPP TSG RAN WG1 #87; Reno, USA Nov. 14-18, 2016; Agenda item: 6.2.1.7; Source: Samsung; Title: Remaining details on resource pool configuration (R1-1612394).

EPO Communication pursuant to Article 94(3) EPC issued for Application No. 20 872 259.5-1206 —Sep. 30, 2025.

3GPP TSG RAN WG1 Meeting #98; Prague, CZ, Aug. 26-30, 2019; Agenda Item: 6.2.2.4; Source: Ericsson; Title: Coexistence of NB-IOT with NR (R1-1908030).

Notice of Preliminary Rejection issue for Korean Patent Application No. 10-2022-7008711; Issue Date: Oct. 16, 2025 (translated Summary included).

* cited by examiner

Subframe

601

600

Receive configuration message

602

Use one or more radio resources for communication based on the resource reservation scheme

603

Receive transmission comprising control/ data

650

651

652

Receiving unit

653

Control unit

Processing circuitry

654

Memory

QQ3000

QQ3225
Antenna(s)

QQ3200
Radio Unit

QQ3210
Receiver

QQ3220
Transmitter

QQ3230
Control System

QQ3225
Antenna(s)

QQ320
Application / virtual appliance /
virtual node or server / instance

QQ340 VM

QQ350 Virtualization Layer

QQ330 HW

QQ360 Processing circuitry

QQ390-1 Memory    QQ395

QQ370 NIC

QQ380 Physical NI

QQ390-2 Non transitory
storage

QQ395 Instr.

QQ320
Application

QQ320
App

QQ320
App

QQ340 VM

QQ340 VM

QQ340 VM

QQ350 Virtualization Layer

QQ330 HW

QQ360 Processing circuitry

QQ390-1 Memory    QQ395

QQ370 NIC

QQ380 Physical NI

QQ390-2 Non transitory
storage

QQ395 Instr.

QQ3100
Management
and
orchestration

Fig. 14

EFFICIENT RESOURCE RESERVATION FOR LTE-M AND NB-IOT

PRIORITY

This nonprovisional application is a U.S. National Stage Filing under 35 U.S.C. § 371 of International Patent Application Serial No. PCT/CN2020/119981 filed Oct. 9, 2020 and entitled "EFFICIENT RESOURCE RESERVATION FOR LTE-M AND NB-IOT" which claims priority to U.S. Provisional Patent Application No. 62/910,553 filed Oct. 4, 2019 both of which are hereby incorporated by reference in their entirety.

TECHNICAL FIELD

The present disclosure relates to wireless communication, and in particular to efficient resource reservation in long-term evolution for machine-type communications (LTE-M) and narrowband internet-of-things (NB-IoT).

BACKGROUND

The Third Generation Partnership Project (3GPP) has developed and is developing standards for Fourth Generation (4G) (also referred to as Long Term Evolution, LTE) and Fifth Generation (5G) (also referred to as New Radio, NR) wireless communication systems. Such systems provide, among other features, broadband communication between network nodes, such as base stations, and mobile wireless devices (WDs), as well as communication between network nodes and between WDs.

Machine-type communications are widely used in many applications such as vehicle tracking, user and home security, banking, remote monitoring and smart grid. According to some reports, by 2023 there will be 3.5 billion wide-area devices connected to cellular networks. In this regard, LTE-M (also referred to as LTE-Machine Type Communications (LTE-MTC), or eMTC) and narrowband Internet-of-Things (NB-IoT) technologies are being rolled out at a fast pace, and it is foreseen that in the next few years, a massive number of devices will be connected to the networks, addressing a wide spectrum of LTE-M and NB-IoT use cases. Thanks to a design that enables 10-year battery lifetime of LTE-M and NB-IoT devices, many of these devices will remain in service years after deployment. During the lifetime of these deployed devices, many networks will undergo LTE to NR migration. A smooth migration without causing service interruption to the deployed LTE-M and NB-IoT devices is extremely important to mobile network operators (MNO). Furthermore, a migration solution that ensures superior radio resource utilization efficiency and superior coexistence performance between LTE-M/NB-IoT and NR is highly desirable. FIG. 2a is a diagram showing NR and LTE-M coexistence, and FIG. 2b is a diagram showing NR and NB-IoT coexistence.

NR resources in frequency and time domains can be configured for embedding LTE-M and NB-IoT inside an NR carrier. In frequency domain, LTE-M specific physical signals and channels transmitted within so-called narrowbands. A narrowband spans over six Physical Resource Blocks (PRBs) where each PRB consists of 12 subcarriers. NB-IoT includes one anchor carrier with one PRB which mainly carries system information and synchronization signals. In a multi-carrier NB-IoT deployment, in addition to the anchor carrier, there can be multiple non-anchor carriers for boosting the capacity.

Moreover, in order to ensure an efficient coexistence between NR and LTE-M/NB-IoT, it may be desirable to avoid collision between NR and LTE-M/NB-IoT key transmissions and protecting specific signals and/or channels. Further, while avoiding collision between NR and LTE-M/NB-IoT transmissions, resource efficiency should be considered in the coexistence scenario.

SUMMARY

It is therefore an object of the present disclosure to provide a network node for handling communication of wireless devices in a wireless communication network, method performed by a network node, a wireless device for communicating with a network node in a wireless communication network, a method performed by a wireless device, which alleviate all or at least some of the above-discussed drawbacks of presently known solutions.

It is also an object of the present disclosure to provide a solution for efficient coexistence between NR and LTE-M/NB-IoT.

These and other objects are achieved by means of a network node for handling communication of wireless devices in a wireless communication network, method performed by a network node, a wireless device for communicating with a network node in a wireless communication network, a method performed by a wireless device as defined in the appended claims. The term exemplary is in the present context to be understood as serving as an instance, example or illustration.

According to an aspect, a network node for handling communication of wireless devices in a wireless communication network is provided. The network node comprises processing circuitry configured to send a first configuration message to a wireless device, wherein the first configuration message comprises a resource reservation scheme. The resource reservation scheme comprises at least one bitmap indicating at least one reserved resource, where the at least one bitmap indicates reserved resources within a subframe, and where resources carrying a predefined reference signal have been excluded from the bitmap.

According to an aspect, a method performed by a network node for handling communication of wireless devices in a wireless communication network is provided. The method comprises sending a first configuration message to a wireless device, where the first configuration message comprises a resource reservation scheme. The resource reservation scheme comprises at least one bitmap indicating at least one reserved resource, where the at least one bitmap indicates reserved resources within a subframe, and where resources carrying a predefined reference signal have been excluded from the bitmap. With this aspect of the disclosure, similar advantages and preferred features are present as in the previously discussed aspect of the disclosure, and vice versa.

According to an aspect, a wireless device for communicating with a network node in a wireless communication network is provided. The wireless device comprising processing circuitry configured to receive a first configuration message from the network node, where the configuration message comprises a resource reservation scheme indicating at least one reserved resource. The processing circuitry is further configured to use, based on the received first configuration message, one or more radio resources for communicating in the wireless communication network. The resource reservation scheme comprises at least one bitmap indicating the at least one reserved resource, where the at least one bitmap indicates reserved resources within a subframe, and where resources carrying a predefined reference signal have been excluded from the bitmap. With this aspect of the disclosure, similar advantages and preferred features are present as in the previously discussed aspects of the disclosure, and vice versa.

According to an aspect, a method performed by a wireless device for communication with a network node in a wireless communication network is provided. The method comprises receiving a first configuration message from the network node, where the configuration message comprises a resource reservation scheme indicating at least one reserved resource. The method further comprises using, based on the received first configuration message, one or more radio resources for communicating in the wireless communication network. The resource reservation scheme comprises at least one bitmap indicating the at least one reserved resource, where the at least one bitmap indicates reserved resources within a sub-frame, and where resources carrying a predefined reference signal have been excluded from the bitmap.

Embodiments described herein may provide one or more of the following technical advantages. In some embodiments, the proposed approach may be used to effectively deploy LTE-M and NB-IoT in coexistence with NR. In more detail, with the proposed resource reservation scheme NR essential signals/channels are protected while maintaining LTE-M/NB-IoT performance. In more detail, some embodiments may improve resource utilization in NR and LTE-M/NB-IoT coexistence, i.e. minimize the amount of wasted (unused) resource elements. Moreover, some embodiments may provide reduced overhead as it avoids reserving unnecessary resources. Further, some embodiments may provide increased flexibility for reserving resources in coexistence scenarios.

Further embodiments of the disclosure are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present disclosure will in the following be further clarified with reference to the embodiments described hereinafter.

BRIEF DESCRIPTION OF THE DRAWINGS

Further objects, features and advantages of embodiments of the disclosure will appear from the following detailed description, reference being made to the accompanying drawings, in which:

FIG. 14 is a schematic illustration of a virtualization environment in accordance with some embodiments.

DETAILED DESCRIPTION

Figure 1:
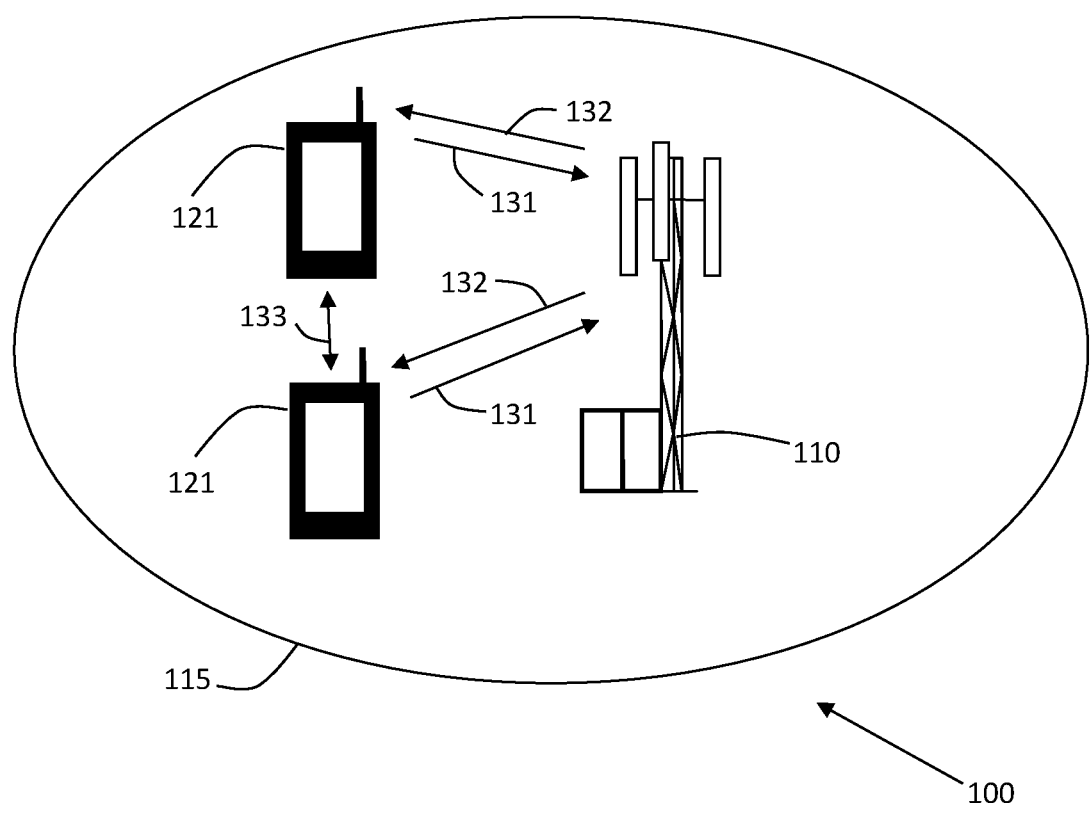
FIG. 1 is a schematic illustration of a network node and a wireless device in a wireless communications network.
Figure 2A:
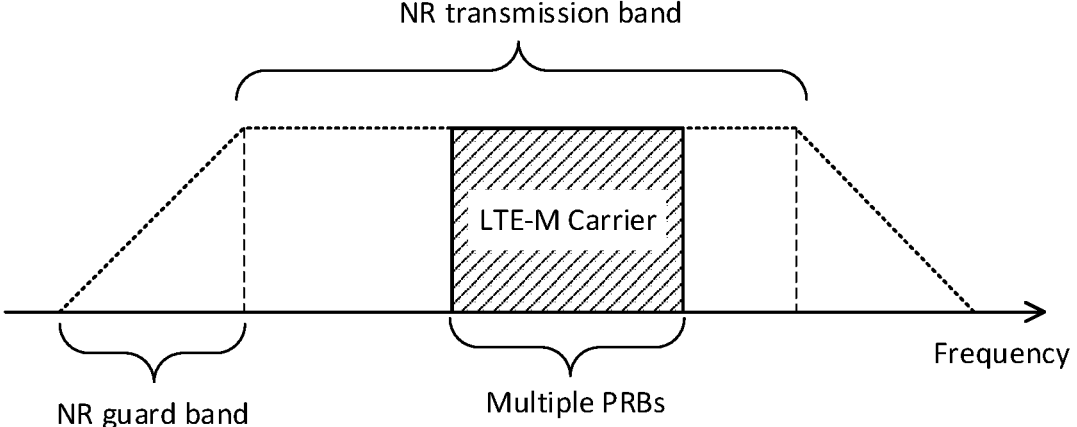
FIG. 2a is a schematic illustration of a chart showing NR and LTE-M coexistence.
Figure 2B:
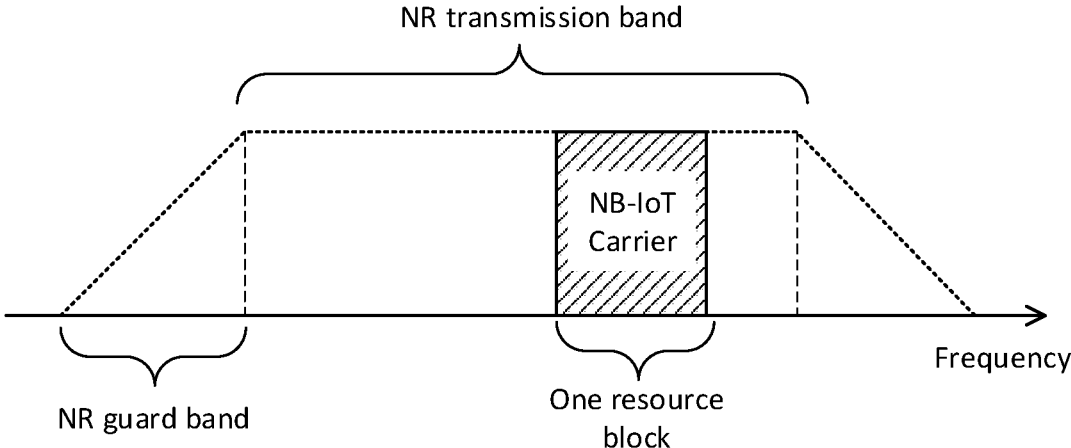
FIG. 2b is a schematic illustration of a chart showing NR and NB-IoT coexistence.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

FIG. 1 depicts a wireless communications network 100 in which embodiments herein may operate. In some embodiments, the wireless communications network 100 may be a radio communications network, such as, 5G or NR network. Although, the wireless communications network 100 is exemplified herein as an 5G or NR network, the wireless communications network 100 may also employ technology of any one of LTE, LTE-Advanced, WCDMA, GSM/EDGE, WiMax, UMB, GSM, or any other similar network or system. The wireless communications network 100 may also employ technology of an Ultra Dense Network, UDN, which e.g. may transmit on millimetre-waves (mmW).

The wireless communications network 100 comprises a network node 110. The network node 110 may serve wireless devices in at least one cell 115, or coverage area. The network node 110 may correspond to any type of network node or radio network node capable of communicating with a wireless device and/or with another network node, such as, a base station (BS), a radio base station, gNB, eNB, eNodeB, a Home NodeB, a Home eNodeB, a femto Base Station (BS), or a pico BS in the wireless communications network 100. Further examples of the network node 110 may be a repeater, multi-standard radio (MSR) radio node such as MSR BS, network controller, radio network controller (RNC), base station controller (BSC), relay, donor node controlling relay, base transceiver station (BTS), access point (AP), transmission points, transmission nodes, a Remote Radio Unit (RRU), a Remote Radio Head (RRH), nodes in distributed antenna system (DAS), or core network node.

In FIG. 1, two wireless devices 121 are located within the cell 115. The wireless devices 121 are configured to communicate within the wireless communications network 100 via the network node 110 over a radio link served by the network node 110. Utilizing the radio link, a bi-directional communications flow may be set up between the wireless devices 121 and any entity capable of communication via the wireless communications network 100. The wireless devices 121 may transmit data over an air or radio interface to the radio base station 110 in uplink, UL, transmissions 131 and the radio base station may transmit data over an air or radio interface to the wireless devices 121 in downlink, DL, transmissions 132. The wireless devices 121 may refer to any type of wireless devices or user equipments (UEs) communicating with a network node and/or with another wireless device in a cellular, mobile or radio communication network or system.

As part of the developing of the embodiments described herein, it has been realized that there currently exist certain challenges as will be elaborated upon in the following. As mentioned, in order to ensure an efficient coexistence between NR and LTE-M/NB-IoT, it may be important to avoid collision between NR and LTE-M/NB-IoT key transmissions and protecting specific signals/channels. For instance, the following signals/channels may need to be protected:

1) For NR: CORESET, SSB, CSI-RS and TRS.
2) For LTE-M: CRS, PSS, SSS.
3) For NB-IoT: NPSS, NSSS, NRS, NPBCH.

Moreover, while avoiding collision between NR and LTE-M/NB-IoT transmissions, resource efficiency needs to be taken into account in the coexistence scenario.

In NR, the concept of reserved resources was introduced to, among other benefits, facilitate forward compatibility and future radio interface extensions. The reserved resources, which are not used by NR UEs, can also be utilized to facilitate the coexistence of NR and LTE-M. "Not used" means that an NR PDSCH transmission is not mapped to resource elements that are reserved. As these reserved resources are known to the NR UE, the UE knows which resource elements are used for PDSCH and which are not, for correct de-mapping. Resource reservation in NR exists on two levels, resource block (RB) level and resource element (RE) level. On RB level, a reserved resource consists of all subcarrier in an indicated resource block in frequency domain and for all or a subset of the symbols in the slot. On RE level, certain individual resource elements in an RB and slot are indicated as reserved.

Figure 3:
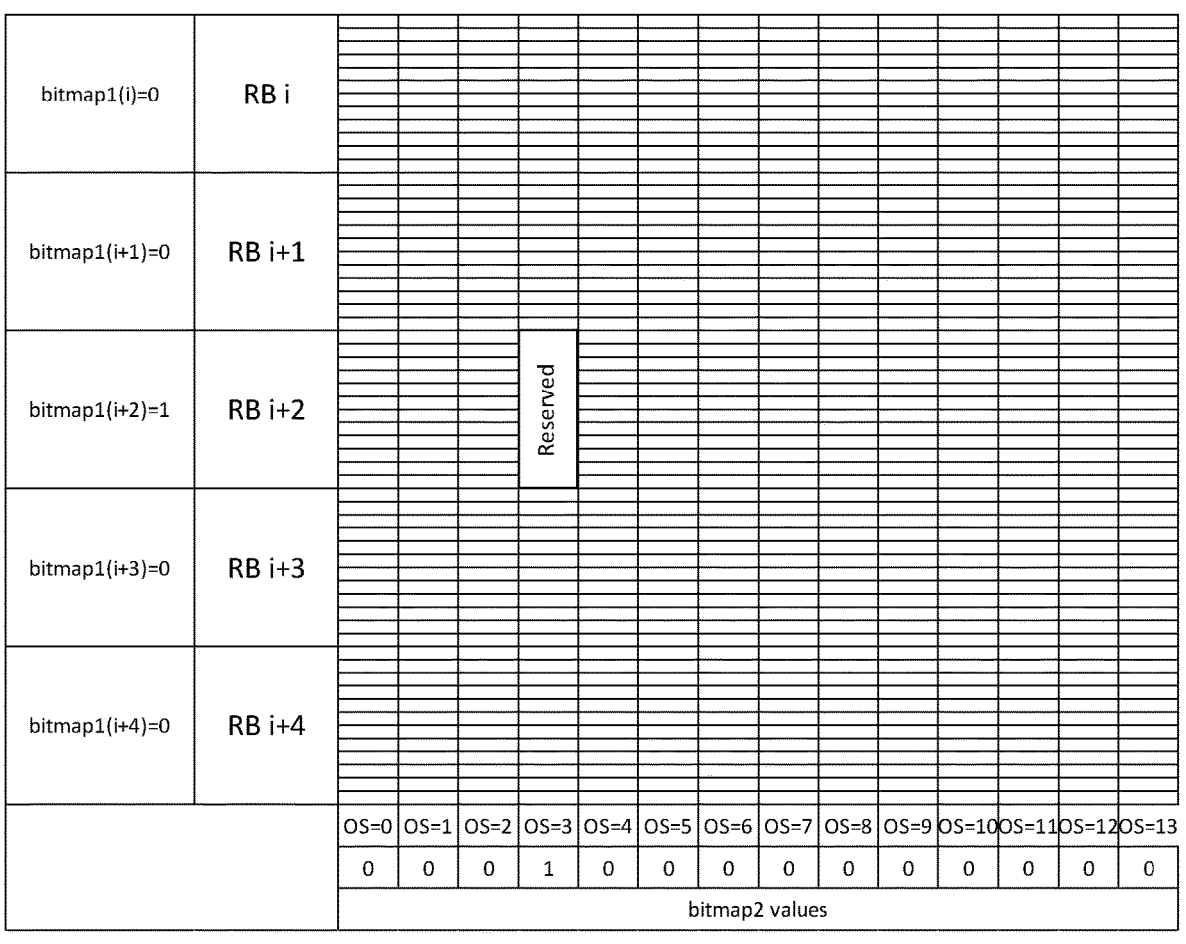
FIG. 3 is a schematic illustration shows an example of use of time and frequency domain resource reservation in NR using two bitmaps.

A flexible way to configure RB level resource reservation in the frequency domain is to use a bit map (bit stream) where each bit represents a physical resource block (PRB). In NR, bitmap 1 (PRBs in frequency domain) and bitmap 2 (symbols in time domain) are used to reserve resources in frequency and time domains, respectively. Hence, the resource reservation in NR is two dimensional. See FIG. 3 for an example of the use of bitmap 1 and 2, using PRB level resource reservation to reserve the REs of one PRB and one OFDM symbol. In other words, FIG. 3 illustrates an NR time-frequency resource reservation using bitmap 1 and bitmap 2.

NR reserved resource configuration is needed to support LTE-M embedding on the same carrier as NR is operating, i.e. to protect LTE-M signals from NR PDSCH transmission. To this end, a set of NR resources can be reserved for non-dynamically scheduled LTE-M transmissions. In particular, resources should be reserved for at least these LTE-M signals, and in particular for this use case, these LTE-M signals:

PSS (Primary Synchronization Signal), and SSS (Secondary Synchronization Signal) used by LTE/LTE-M UE for cell search procedure.

CRS (Cell-specific Reference signal) used by LTE/LTE-M UE for channel estimation, cell selection, and coherent demodulation.

PBCH (Physical Broadcast Channel) that carries system information (i.e., master information block (MIB)) for LTE/LTE-M UE requiring to access the network.

SIB1-BR (SystemInformationBlockType1) contents assist the LTE-M UE when it is evaluating cell access and also defines the scheduling of other system information.

In LTE-M and NB-IoT, the principle of resource reservation also exists, where a cell-specific subframe bitmap can be broadcasted by the eNB 110 to UEs 121, in order to declare valid downlink subframes for LTE-M/NB-IoT subframes. Hence, the resource reservation is one dimensional, either a subframe is valid or invalid (i.e. reserved). In this case, bitmap lengths of 10 or 40 bits are used to determine valid/invalid subframes within 1 or 4 frames (a frame is 10 subframes).

For instance, an LTE-M network may indicate to an LTE-M UE 121, the subframes that are used for Positioning Reference Signal (PRS) or Multimedia Broadcast Multicast Service Single Frequency Network (MBSFN) transmissions as invalid for LTE-M subframes.

When LTE-M and NB-IoT coexist with NR as in dynamic spectrum sharing (DSS), there may be several cases where it would be beneficial if the LTE-M and NB-IoT systems avoid transmitting on resources that are desired to be used by an NR system. In some cases, it is enough to handle this by having the LTE-M/NB-IoT and NR schedulers divide the resources on a PRB and subframe/slot/symbol level, but in some cases, it may also be useful if LTE-M and NR transmission can coexist within the same PRBs. In this regard, valid/invalid LTE-M/NB-IoT subframes can additionally be configured to protect various essential NR signals and channels. In particular, the following NR signals/channels need to be protected:

CORESET (Control Resource Set) where NR PDCCH is located.

The SS/PBCH block (sometimes referred to as SSB) which consists of synchronization signals (PSS and SSS), PBCH and PBCH DM-RS.

TRS (Tracking Reference Signal) which is a CSI-RS resource set configured to be used for fine synchronization and channel analysis. It occupies two symbols in two adjacent subframes where the distance between the symbols in a subframe is four symbols.

CSI-RS (Channel State Information Reference Signal) to be used for CSI measurements, beam management or mobility measurements. It can be configured to start in any symbol in a subframe and can occupy 1, 2 or 4 symbols.

Figure 4:
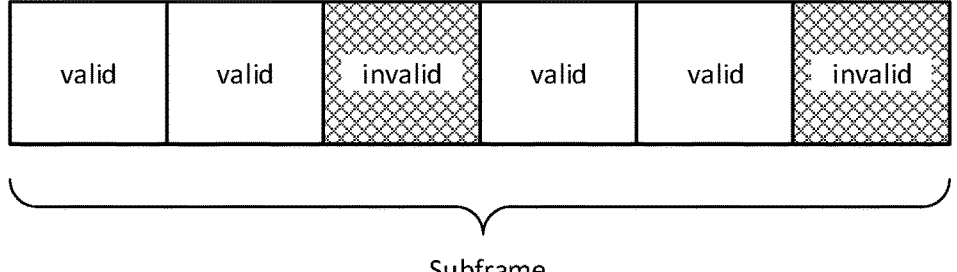
FIG. 4 is a schematic illustration of LTE-M or NB-IoT subframes.

Clearly, valid/invalid LTE-M and NB-IoT subframes can be useful to avoid collision between NR and LTE-M/NB-IoT. FIG. 4 schematically depicts valid/invalid LTE-M or NB-IoT subframes.

It should again be noted that invalid LTE-M and NB-IoT subframes configuration can be considered as subframe-level resource reservation. The present disclosure may in some embodiments focus on LTE-M and NB-IoT resource reservation. Note that such reserved resources are not used for LTE-M/NB-IoT transmissions and can be dedicated to NR signals/channels.

In the existing subframe-level LTE-M/NB-IoT resource reservation schemes, LTE-M/NB-IoT transmissions are not allowed anywhere in the entire invalid subframe(s). This, however, may degrade the coexistence performance in terms of resource utilization. Considering the time-domain structure of NR signals/channels, it can be seen that they only occupy a single or a few OFDM symbols, thus if such subframe is reserved for NR transmission, the rest of the reserved LTE-M/NB-IoT subframe will be wasted as LTE-M/NB-IoT transmission cannot take place there.

For example, SSB may span over four OFDM symbols, CORESET can occupy one, two, or three symbols within an NR slot (i.e., one subframe in 15 kHz SCS case). Similarly, CSI-RS and TRS can occupy only few symbols of a slot (typically one or two). As can be concluded, subframe-level LTE-M resource reservation is not efficient from resource utilization point of view.

In this case, one may introduce a finer granularity for reserving LTE-M/NB-IoT resources in time domain. In particular, slot-level and/or symbol-level resource reservation can be introduced in LTE-M and NB-IoT. Having a finer resource reservation (e.g., slot-level or symbol-level) may have two advantages: 1) it improves the resource utilization in NR and LTE-M/NB-IoT coexistence, and 2) it provides a flexibility that can facilitate the coexistence of NR URLLC services with LTE-M/N B-IoT.

Nevertheless, there currently exist certain challenges. In more detail, even though the abovementioned slot-level and/or symbol-level resource reservation schemes help to improve the resource utilization, there are further optimizations that can be achieved by considering resource usage of the signals in more detail. For example, the existing schemes do not consider the location of reference symbols in connection with the resource reservation. Accordingly, there is a problem in how to achieve an efficient resource reservation scheme to properly configure reserved resources in LTE-M and NB-IoT. Furthermore, the overhead associated with resource reservation with small granularity should be taken into account.

Certain aspects of the present disclosure and their embodiments aim to provide solutions to these or other challenges. In this disclosure, there is provided an efficient resource reservation scheme in LTE-M and NB-IoT to ensure coexistence between NR and LTE-M/NB-IoT systems with reduced waste of resources and overhead. Some embodiments proposed in the disclosure are based on an optimized time-domain resource reservation in LTE-M/NB-IoT to prevent collision with NR signals/channels. To efficiently reserve LTE-M and NB-IoT resources, the proposed scheme avoids reserving resources used for essential or prioritized LTE-M/NB-IoT signals.

Specifically, according to some embodiments, symbols used for DMRS and CRS for LTE-M, and NRS for NB-IoT, should not be reserved. The resource reservation method may be optimized based on the patterns of LTE-M CRS/DMRS and NB-IoT NRS. Such optimized resource reservation prevents performance degradation by protecting LTE-M/NB-IoT reference signals. Moreover, it reduces the overhead of LTE-M/NB-IoT resource reservation by decreasing the number of bits (e.g., bitmap) needed for reserving symbols within a subframe. Embodiments described herein, and aspects thereof may enable an optimized resource reservation scheme in LTE-M and NB-IoT when coexisting with NR. Such optimized resource reservation may allows efficient coexistence between NR and LTE-M/NB-IoT by enhancing resource utilization and protecting essential signals/channels of NR, LTE-M, and NB-IoT.

Figure 5A:
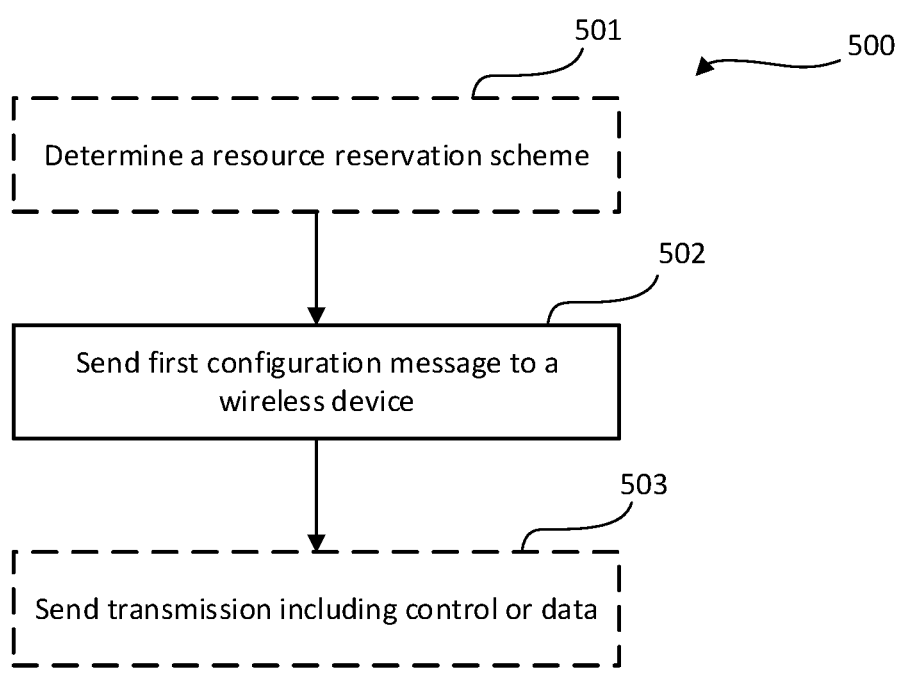
FIG. 5a is a schematic flow chart representation of a method performed by a network node for handling communication of wireless devices in a wireless communication network in accordance with some embodiments.

Accordingly, example embodiments of a method 500 performed by a network node for handling communication of wireless devices in a wireless communication network will now be described with reference to the schematic flowchart illustrated in FIG. 5a. FIG. 5a is an illustrated example of actions or operations, which may be taken or performed by the network node 110 in the wireless communication network 100 described and shown in FIG. 1. The method 500 may comprise a step of determining 501 or otherwise obtaining 501 a resource reservation scheme indicating at least one reserved resource. Further, the method 500 comprises sending 501 a first configuration message to a wireless device, where the first configuration message comprises the resource reservation scheme. The resource reservation scheme may also be referred to as a resource reservation protocol. Furthermore, the resource reservation scheme comprises at least one bitmap indicating at least one reserved resource, where the at least one bitmap indicates reserved resources within a subframe, and where resources carrying a predefined reference signal have been excluded from the bitmap.

The term "reserved" as used herein, refers to it being reserved for other use, i.e. not to be used by the system within which the reservation is done. Thus, in some embodiments, a resource indicated as a reserved resource is not used for transmission from the network node to the wireless device (and vice versa), and a resource not indicated as a reserved resource is allowable to be used for transmission from the network node to the wireless device (and vice versa).

In some embodiments, the predefined reference signal is at least one of a Demodulation Reference Signal (DMRS), a Cell-specific Reference Signal (CRS), and a Narrowband Reference Signal (NRS). In some embodiments, the method 500 may further comprise sending 503 a transmission comprising control or data to the wireless device based on the at least one reserved resource. In some embodiments, the step of sending 501 the first configuration message further comprises broadcasting the first configuration message to a plurality of wireless devices or sending the first configuration message as a dedicated Radio Resource Control (RRC) message to a specific wireless device.

Further, in some embodiments, the resource reservation scheme comprises a two-level bitmap indicating the at least one reserved resource. Moreover, in some embodiments a first level of the two-level bitmap indicates a subset of subframes of the bitmap, and a second level of the two-level bitmap indicates any reserved Orthogonal Frequency-Division Multiplexing (OFDM) symbol(s) within a subframe of the subset of subframes.

In NB-IoT, the NRS is used to allow the device to perform DL channel estimation and DL signal quality measurements. Thus, in some embodiments, the two-level bitmap indicates at least one reserved OFDM symbol within a subframe of the bitmap, wherein any OFDM symbol carrying a Narrowband Reference Signal (NRS) is excluded from the bitmap.

Analogously, in LTE-M, Demodulation Reference Signals (DMRS) are used for channel estimation and coherent demodulation at UE, and the CRS can be used for demodulation of PDSCH or PBCH. Thus, in some embodiments, the two-level bitmap indicates at least one reserved OFDM symbol within a subframe of the bitmap, wherein any OFDM symbol carrying a DMRS or CRS is excluded from the bitmap.

In other words, in some embodiments, the two-level bitmap indicates at least one reserved OFDM symbol within a subframe of the bitmap, wherein at least one OFDM symbol has been excluded from the bitmap based on at least one rule. The at least one rule may for example define that any OFDM symbol carrying a Demodulation Reference Signal (DMRS) is excluded from the bitmap. Further, the at least one rule may define that any OFDM symbol carrying a Cell-specific Reference Signal (CRS) is excluded from the bitmap. Furthermore, the at least one rule may define that any OFDM symbol carrying a Narrowband Reference Signal (NRS) is excluded from the bitmap.

Further, the resource reservation process for NB-IoT and LTE-M may be optimized based on the patterns of NRS and CRS/DMRS, respectively. For example, for LTE-M, if DMRS occupies four symbols, and CRS four or six other symbols, the resource reservation may apply to the remaining six or four symbols in the subframe, which allows for a considerable reduction in signaling overhead for indication symbols that are reserved. Thus, in some embodiments the resource reservation scheme is based on a pattern of OFDM symbols carrying NRSs within the subframe such that the indicated at least one reserved resource is based on any remaining OFDM symbols that are not carrying NRSs. Analogously, in some embodiments, the resource reservation scheme is based on a pattern of OFDM symbols carrying Demodulation Reference Signals, DMRSs, and OFDM symbols carrying Cell-specific Reference Signals, CRSs, within the subframe such that the indicated at least one reserved resource is based on any remaining OFDM symbols that are not carrying DMRSs or CRSs.

Moreover, in some embodiments, the resource reservation scheme is based on a pattern of OFDM symbols carrying Demodulation Reference Signals (DMRS) and OFDM symbols carrying Cell-specific Reference Signals (CRS) within a resource pool such that the indicated at least one reserved resource is based on any remaining OFDM symbols that are not carrying Demodulation Reference Signals (DMRS) or Cell-specific Reference Signals (CRS).

In some embodiments, the resource reservation scheme is based on a pattern of OFDM symbols carrying Narrowband Reference Signals (NRS) within a resource pool such that the indicated at least one reserved resource is based on any remaining OFDM symbols that are not carrying Narrowband Reference Signals (NRS).

In some embodiments, the method 500 further comprises sending a second configuration message, wherein the second configuration message comprises information about at least one reference signal for which a corresponding OFDM symbol of the at least one OFDM symbol that has been excluded from the bitmap. However, in some embodiments, the first configuration message further comprises information about at least one reference signal for which a corresponding OFDM symbol of the at least one OFDM symbol that has been excluded from the bitmap. Moreover, in some embodiments, the method 500 obtaining user data, and forwarding the user data to a host computer or a wireless device.

In summary, in some embodiments, the resource reservation scheme may be a resource reservation scheme/protocol configured to ignore/exclude the OFDM symbols carrying one or more predefined reference signals (e.g. a Demodulation Reference Signal (DMRS), a Cell-specific Reference Signals (CRS), and/or a Narrowband Reference Signal (NRS). In some embodiments, any resource reservation scheme/protocol that is capable of ignoring/excluding the OFDM symbols carrying one or more predefined reference signals (e.g. a Demodulation Reference Signal (DMRS), a Cell-specific Reference Signals (CRS), and/or a Narrowband Reference Signal (NRS)) can be used. Thus, the method in accordance with some embodiments is not limited to resource reservation schemes comprising one or more bitmaps.

Figure 5B:
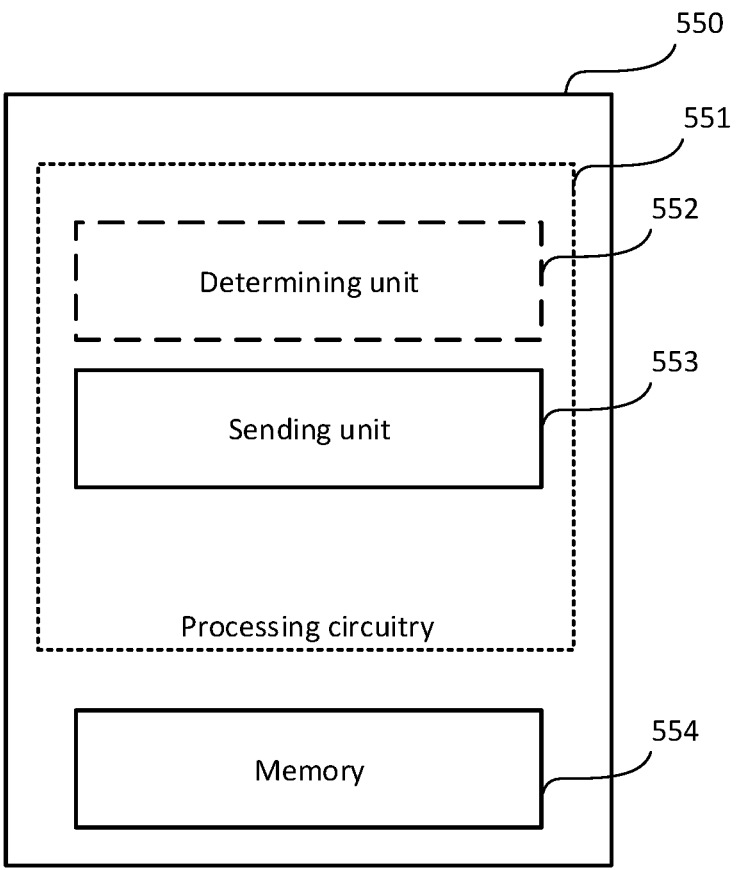
FIG. 5b is a block diagram representation of a network node for handling communication of wireless devices in a wireless communication network in accordance with some embodiments.

FIG. 5*b* is a schematic block diagram representation of embodiments of an apparatus 550 in a wireless communication network 100. The apparatus 550 may be implemented in a base station or network node (e.g. the network node QQ160 shown in FIG. 12). The apparatus is operable to carry out the example methods described with reference to FIG. 5*a*, and possibly any other processes or methods disclosed herein. It is also to be understood that the method of FIG. 5*a* is not necessarily carried out solely by apparatus 550. At least some operations of the method can be performed by one or more other entities. At least some operations of the method could be performed by one or more other entities.

Apparatus 550, also referred to as a virtual apparatus implemented in a base station, may comprise processing circuitry 551, which may include one or more microprocessor or microcontrollers, as well as other digital hardware, which may include digital signal processors (DSPs), special-purpose digital logic, and the like. The processing circuitry 551 may be configured to execute program code stored in memory 554, which may include one or several types of memory 554 such as read-only memory (ROM), random-access memory, cache memory, flash memory devices, optical storage devices, etc. Program code stored in memory 554 includes program instructions for executing one or more telecommunications and/or data communications protocols as well as instructions for carrying out one or more of the techniques described herein, in several embodiments. In some implementations, the processing circuitry may be used to cause a determining unit 552 and sending unit 553, and any other suitable units of apparatus 550 to perform corresponding functions according one or more embodiments of the present disclosure.

The network node 110 or processing circuitry therein may be configured to, or may comprise the determining unit 552 configured to, determining or otherwise obtaining a resource reservation scheme indicating at least one reserved resource. Further, the processing circuitry 551 is configured to, or may comprise a sending unit 554 configured to, send a first configuration message to a wireless device, where the first configuration message comprises the resource reservation scheme. The resource reservation scheme comprises at least one bitmap indicating at least one reserved resource, wherein the at least one bitmap indicates reserved resources within a subframe, and wherein resources carrying a predefined reference signal have been excluded from the bitmap.

Figures 6A, 6B:
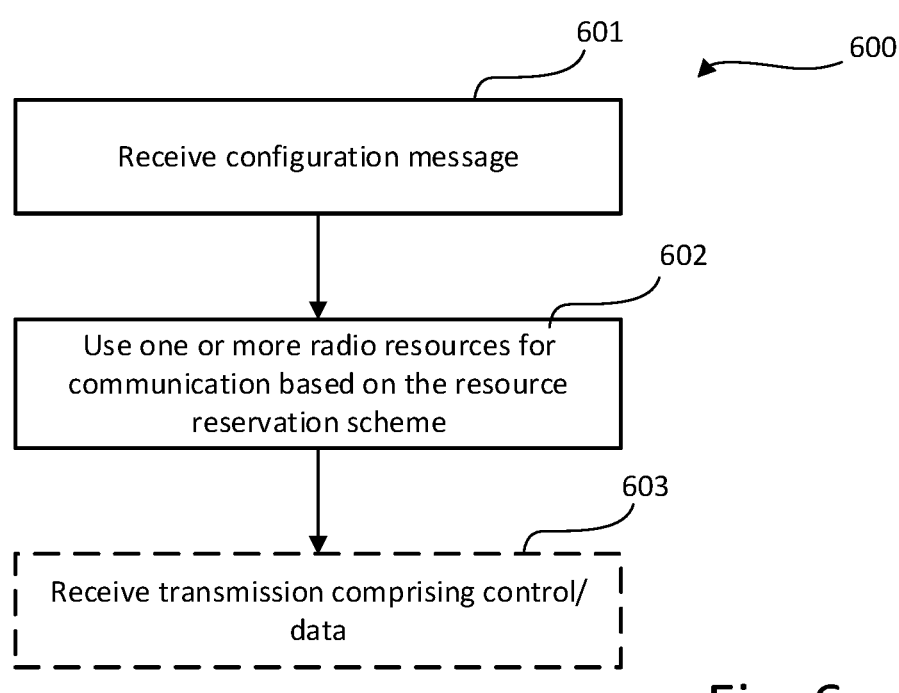
FIG. 6a is a flow chart representation of a method performed by a wireless device for communication with a network node in a wireless communication network in accordance with some embodiments.
FIG. 6b is a block diagram representation of a wireless device for communication with a network node in a wireless communication network in accordance with some embodiments.

Moving on, example embodiments of a method 600 performed by a wireless device for communication with a network node in a wireless communication network will now be described with reference to the schematic flow chart illustrated in FIG. 6*a*. FIG. 6*a* is an illustrated example of actions or operations, which may be taken or performed by the wireless device 121 in the wireless communication network 100 described and shown in FIG. 1. The method 600 comprises receiving 601 a first configuration message from the network node, the configuration message comprising a resource reservation scheme indicating at least one reserved resource. The resource reservation scheme comprises at least one bitmap indicating the at least one reserved resource, where the at least one bitmap indicates reserved resources within a subframe, and where resources carrying a predefined reference signal have been excluded from the bitmap. The method 600 further comprises using, based on the received first configuration message, one or more radio resources for communicating in the wireless communication network. In other words, using one or more radio resources based on the reservation scheme.

The term "reserved" as used herein, refers to it being reserved for other use, i.e. not to be used by the system within which the reservation is done. Thus, in some embodiments, a resource indicated as a reserved resource is not used for transmission from the wireless device to the network node (and vice versa), and a resource not indicated as a reserved resource is allowable to be used for transmission from the wireless device to the network node (and vice versa).

As mentioned, resources carrying a predefined reference signal have been excluded from the bitmap. In some embodiments, the predefined reference signal is at least one of a Demodulation Reference Signal (DMRS), a Cell-specific Reference Signal (CRS), and a Narrowband Reference Signal (NRS). Further, the method 600 may further comprise receiving a transmission comprising control or data from the network node based on the at least one indicated reserved resource.

Further, in some embodiments, the method 600 further comprises receiving a second configuration message, wherein the second configuration message comprises information about at least one reference signal for which a corresponding OFDM symbol of the at least one OFDM symbol that has been excluded from the bitmap. However, in some embodiments, the first configuration message further comprises information about at least one reference signal for which a corresponding OFDM symbol of the at least one OFDM symbol that has been excluded from the bitmap.

Moreover, in some embodiments, the method 600 further comprises providing user data, and forwarding the user data to a host computer via the transmission to the base station.

FIG. 6b is a schematic block diagram representation of embodiments of an apparatus 650 in a wireless communication network 100 (for example, the wireless network shown in FIG. 1). The apparatus 550 may be implemented in a wireless device (e.g. the wireless device 121 shown in FIG. 1). The apparatus is operable to carry out the example methods described with reference to FIG. 6a, and possibly any other processes or methods disclosed herein. It is also to be understood that the method of FIG. 6a is not necessarily carried out solely by apparatus 650. At least some operations of the method can be performed by one or more other entities. At least some operations of the method could be performed by one or more other entities.

Apparatus 650, also referred to as a virtual apparatus implemented in a wireless device or user equipment, may comprise processing circuitry 651, which may include one or more microprocessor or microcontrollers, as well as other digital hardware, which may include digital signal processors (DSPs), special-purpose digital logic, and the like. The processing circuitry 651 may be configured to execute program code stored in memory 654, which may include one or several types of memory 654 such as read-only memory (ROM), random-access memory, cache memory, flash memory devices, optical storage devices, etc. Program code stored in memory 654 includes program instructions for executing one or more telecommunications and/or data communications protocols as well as instructions for carrying out one or more of the techniques described herein, in several embodiments. In some implementations, the processing circuitry 651 may be used to cause a receiving unit 652, a control unit 653, and any other suitable units of apparatus 650 to perform corresponding functions according one or more embodiments of the present disclosure.

The wireless device 650 or processing circuitry therein is configured to, or may comprise a receiving unit 652 configured to, receive a first configuration message from the network node, the configuration message comprising a resource reservation scheme indicating at least one reserved resource. Also, the wireless device 650 or processing circuitry therein is configured to, or may comprise a control unit 653 configured to, use, based on the received first configuration message, one or more radio resources for communicating in the wireless communication network. As before, the resource reservation scheme comprises at least one bitmap indicating the at least one reserved resource, where the at least one bitmap indicates reserved resources within a subframe, and where resources carrying a predefined reference signal have been excluded from the bitmap.

Having described the general process flow of arrangements of the disclosure and having provided examples of hardware and software arrangements for implementing the processes and functions of the disclosure, the sections below provide details and examples of arrangements for Long term Evolution-Machine type (LTE-M) and Narrowband Internet of Things (NB-IoT) resource reservation in accordance with some embodiments.

Figure 7A:
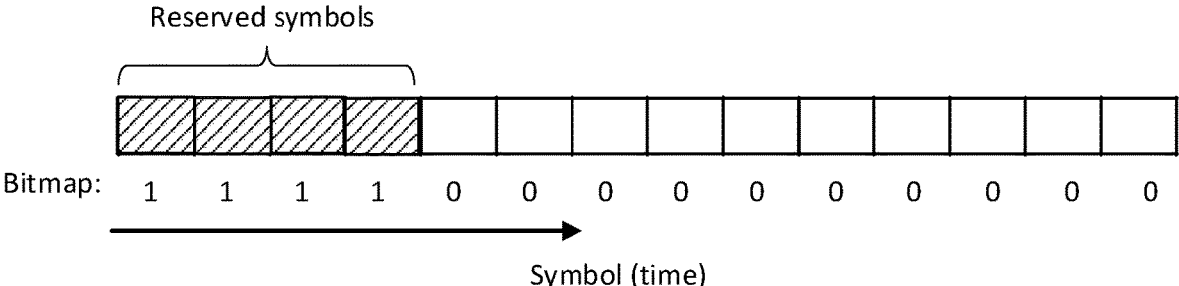
FIG. 7a is a schematic illustration of LTE-M/NB-IoT resource reservation using a bitmap in accordance with some embodiments.

A flexible way to indicate reserved resources in LTE-M and NB-IoT is to use a set of bitmaps. In particular, a bitmap with a specific length can point out to time-domain resources (symbols, slots, or subframes) which should not be used by LTE-M/NB-IoT UEs (an illustrative embodiment is shown in FIG. 7a). In the current LTE-M/NB-IoT system there are bitmaps of length 10 or 40 bits that can be used for indicating valid/invalid subframes in downlink and/or uplink within one or four frames. A set is in the present context to be understood as one or more, i.e. a set of elements may comprise a single element or a plurality of elements.

In some embodiments, higher layer parameters fdd-DownlinkOrTddSubframeBitmapBR or fdd-UplinkSubframeBitmapBR can be used. Alternatively for some embodiments, for the downlink, the bitmap indicating the pattern of valid subframes may be given by the parameter MBSFN-SubframeConfig. Accordingly, a smaller resource reservation granularity in LTE-M and NB-IoT may improve the performance of NR and LTE-M/NB-IoT coexistence.

Figure 7B:
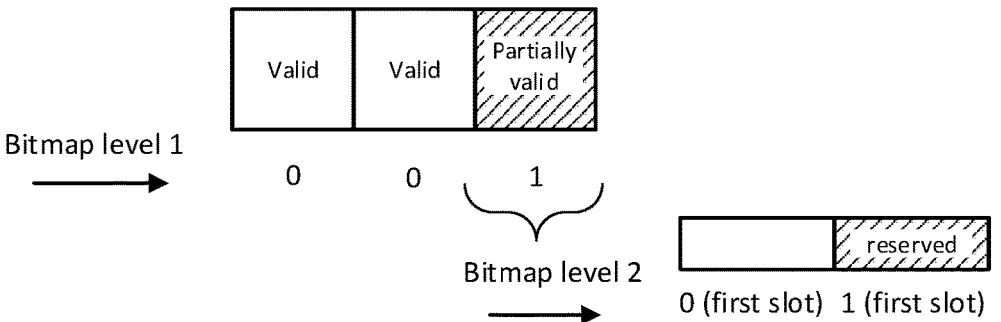
FIG. 7b is a schematic illustration of LTE-M/NB-IoT resource reservation using a two-level bitmap in accordance with some embodiments.

In order to configure slot-level or symbol-level LTE-M/NB-IoT resource reservation, some embodiments include a two-level bitmap, bitmap level 1 and bitmap level 2 operating in the time domain (not to be confused with the NR resource reservation parameters bitmap 1 and bitmap 2 described earlier). Bitmap level 1 indicates a subset of subframes and bitmap level 2 shows the reserved symbols within those subframes identified by bitmap level 1. In some embodiments, in bitmap level 1, a "0" indicates a subframe which is fully available (valid) for LTE-M, and a "1" refers to a subframe which is not fully available (or partially valid) for LTE-M (i.e., some the symbols within this subframe are reserved). Then, bitmap level 2 can be used only for those partially valid subframes to indicate which symbols are reserved. As an example, FIG. 7b, shows the slot-level resource reservation using a two-level bitmap. The second slot of the partially-valid subframe is reserved. The term "reserved" as used herein, refers to it being reserved for other use, i.e. not to be used by the system within which the reservation is done.

In general, the granularity of the second level resource reservation can be one OFDM symbol, two symbols, seven symbols, or fourteen symbols. The one-symbol granularity may be the smallest granularity, the seven-symbol granularity may be slot-level, and 14-symbol granularity may be the existing subframe-level resource reservation.

The overhead of resource reservation may depend on the bitmap length which itself depends on the granularity as well as the number of symbols which need to be reserved within a given subframe. To ensure proper operation of LTE-M and NB-IoT, one should avoid reserving resources used for essential or prioritized LTE-M/NB-IoT signals. In some embodiments, symbols used for LTE-M DMRS and CRS, and NB-IoT NRS are not to be reserved. Such optimized resource reservation has at least two advantages for LTE-M and NB-IoT. Namely, it prevents performance degradation by protecting LTE-M/NB-IoT reference signals, and it reduces the overhead of LTE-M/NB-IoT resource reservation by e.g. decreasing the bitmap length needed for reserving symbols within a subframe.

Figures 8A, 8B:
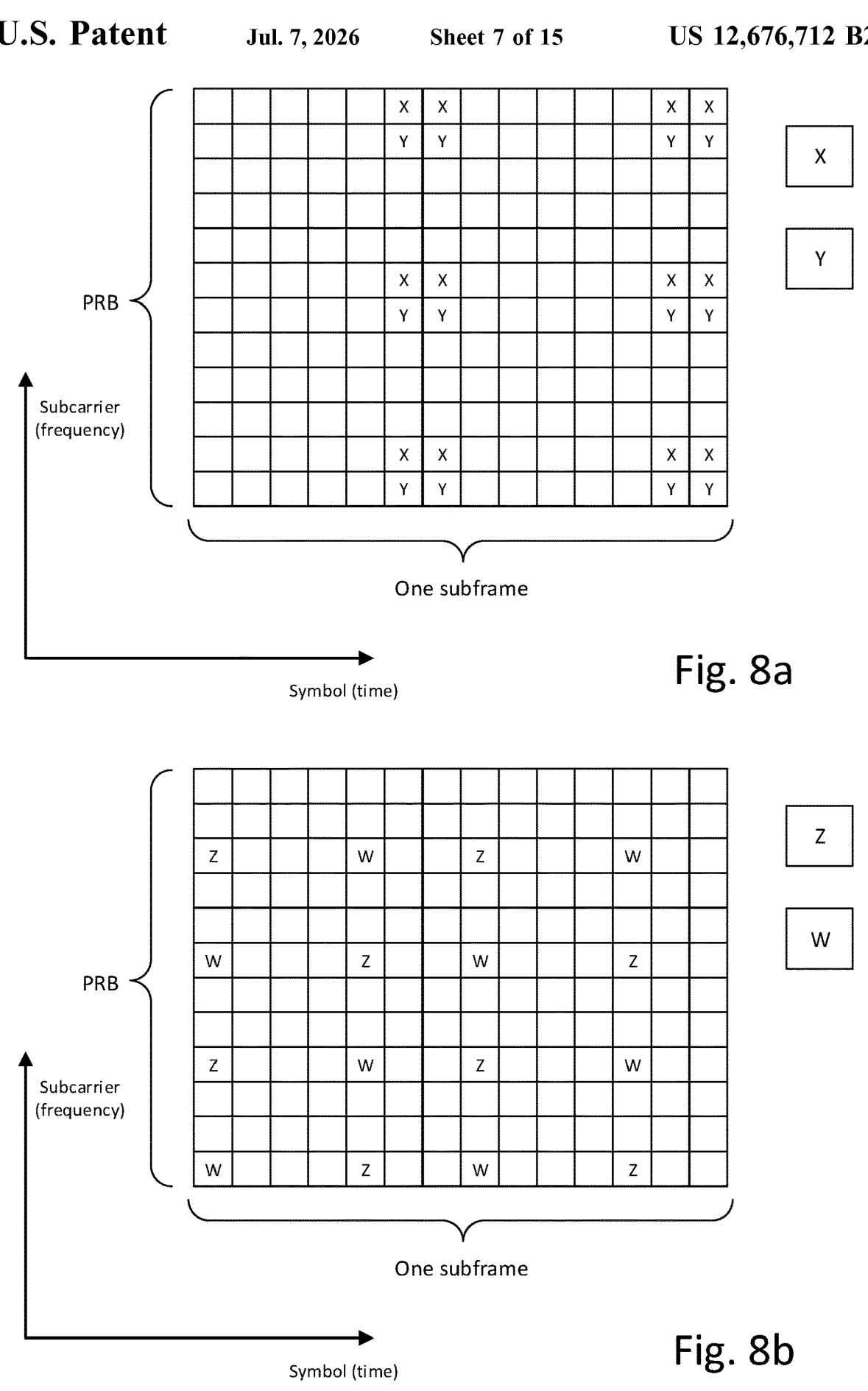
FIG. 8a is a schematic diagram illustrating time-frequency locations of LTE-M DMRS in a set of physical resource blocks in accordance with some embodiments.
FIG. 8b is a schematic diagram illustrating time-frequency locations of LTE-M CRS in a set of physical resource blocks in accordance with some embodiments.

In LTE-M, Demodulation Reference Signals (DMRS) are used for channel estimation and coherent demodulation at UE. The DMRS are configured per device and can be used for demodulation of PDSCH or MPDCCH. DMRS can be transmitted to different UEs from up to four antenna ports (antenna ports #7-#10 for PDSCH and antenna ports #107-#110 for MPDCCH). The time-frequency locations of DMRS in the affected PRBs are disclosed in FIG. 8*a*. In more detail 'X' indicates DMRS from antenna ports #7 and #8 or #107 and #108, while 'Y' indicates DMRS from antenna ports #9 and #10 or #109 and #110. Moreover, FIG. 8*a* shows that DMRS are transmitted in symbols #5, #6, #12, and #13 within a subframe of the affected PRBs, with symbol #0 being the first symbol in the subframe.

Further, the CRS can be used for demodulation of PDSCH or PBCH which is transmitted in every PRB from one, two, or four antenna ports numbered #0-#3. In FIG. 8*b*, the locations of LTE-M CRS are illustrated for two antenna ports ('Z' indicates CRS from antenna port #0, and 'W' indicates CRS from antenna port #1). Here, CRS are transmitted in symbols #0, #4, #7, and #11 within a subframe.

Figure 9:
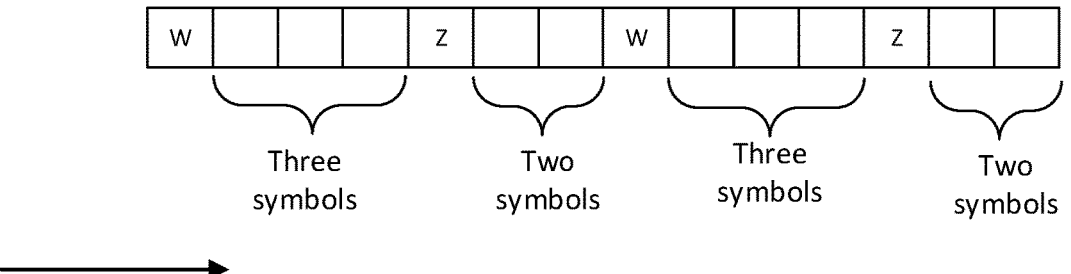
FIG. 9 is a schematic illustration of LTE-M resource reservation excluding CRS in accordance with some embodiments.

According to some embodiments, LTE-M resource reservation only applies to symbols that do not carry CRS. An embodiment is shown in FIG. 9, where the UE knows how many symbols that carry CRS in a non-MBSFN subframe, which can amount to four or six, depending on the number of configured CRS antenna ports. Hence, the resource reservation applies to the remaining ten or eight symbols in non-MBSFN subframes. The symbols containing CRS are never reserved, but are instead available to be used for LTE-M, without any explicit indication. As before, 'Z' indicates CRS from antenna port #0, and 'W' indicates CRS from antenna port #1.

In MBSFN subframes, there is/are only one or two CRS symbols, and the resource reservation potentially be twelve or thirteen symbols. In a carrier configured by MBSFN subframes, at most six subframes can be MBSFN, the rest is non-MBSFN. Hence, resource reservation may need to be indicated separately for MBSFN and non-MBSFN subframes as the number of available symbols differ. Alternatively, only the resource reservation indication made under the assumption for the non-MBSFN subframes (4 or 6 symbols of CRS) is used for both MBSFN and non-MBSFN subframes, for simplicity.

According to some embodiments, LTE-M resource reservation only applies to symbols that do not carry DMRS. In some embodiments, if the UE is configured with a transmission mode that use DMRS for PDSCH demodulation, then the UE and eNB may know which symbols carry DMRS. The symbols containing DMRS may never be reserved, but may instead available to be used for LTE-M, without any explicit indication.

According to some embodiments, LTE-M resource reservation only applies to symbols that do not carry CRS or DMRS.

According to some embodiments, the LTE-M resource reservation method is optimized based on the patterns of CRS and DMRS. For example, since DMRS occupies four symbols, and CRS four or six other symbols, the resource reservation may apply to the remaining six or four symbols in the subframe, which allows for a considerable reduction in signaling overhead for indication symbols that are reserved.

According to some embodiments, a bitmap indicator is provided/generated/designed based on the locations of symbols that do not carry CRS or DMRS. The symbols containing CRS and DMRS are never reserved, but are instead available to be used for LTE-M, without any explicit indication.

Figure 10:
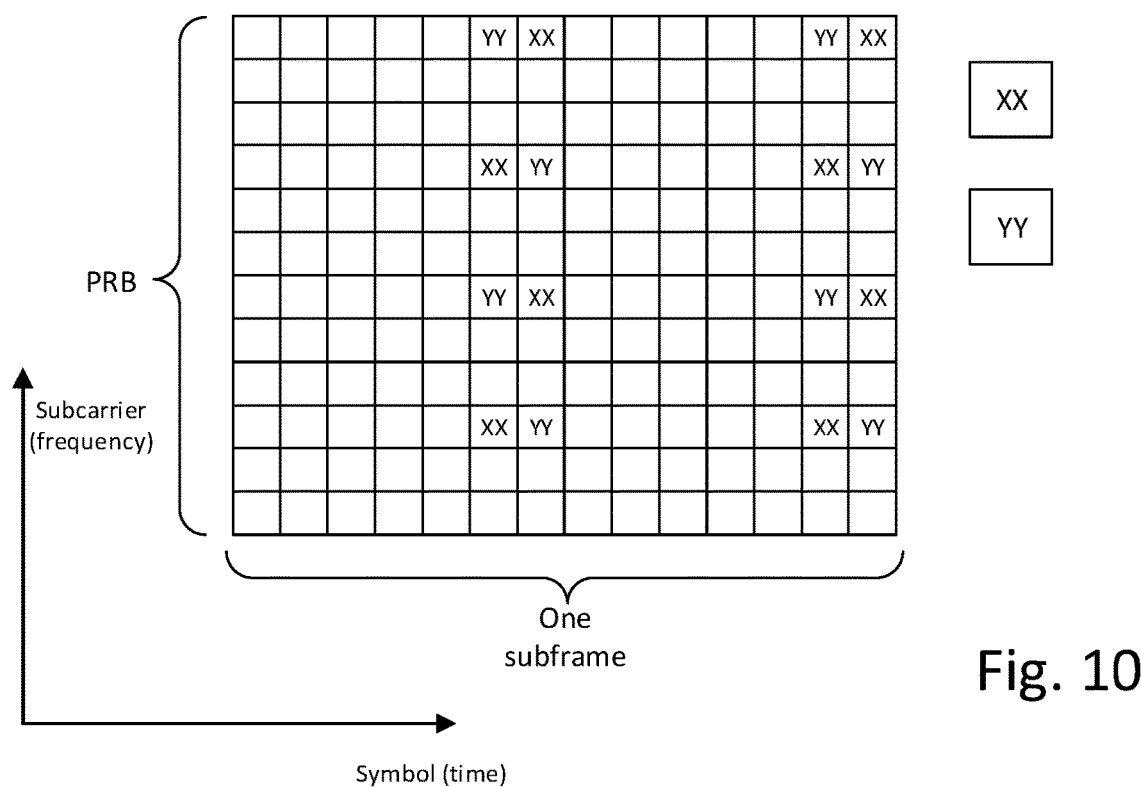
FIG. 10 is a schematic diagram illustrating time-frequency locations of NB-IoT NRS in a set of physical resource blocks in accordance with some embodiments.

According to some embodiments, multi-granularity resource reservation is considered to efficiently reserve resources. For example, a pair of two-symbol and three-symbol granularities can be considered to reserved LTE-M symbols that lie between CRS symbols within a subframe, as shown in FIG. 10.

Moving on, in NB-IoT, the NRS is used to allow the device to perform DL channel estimation and DL signal quality measurements. NRS is typically transmitted in the last two symbols in every slot within a subframe that carries NPBCH, NPDCCH, or NPDSCH (NRS may be transmitted also in subframes that do not have any NPDCCH or NPDSCH scheduled). Within one frame (with 10 subframes indexed from 0 to 9), NRS is transmitted at least in subframes #0 and #4 and #9 not containing NSSS. FIG. 10 shows an example of NRS locations for two antenna ports. In this case, NRS transmitted in symbols #5, #6, #12, and #13 within a subframe, where 'XX' indicates NRS from antenna port #0, and 'YY' indicates NRS from antenna port #1.

According to some embodiments, NB-IoT resource reservation only applies to symbols that do not carry NRS. In other words, symbols carrying NRS are excluded from resource reservation. According to some embodiments, the NB-IoT resource reservation method is optimized based on the pattern of NRS.

According to some embodiments, a bitmap indicator is designed based on the locations of symbols that do not carry NRS. Hence it is only to reserve resources indicated by the bitmap. The symbols containing NRS are never reserved, but may instead available to be used for NB-IoT, without any explicit indication.

Figure 11:
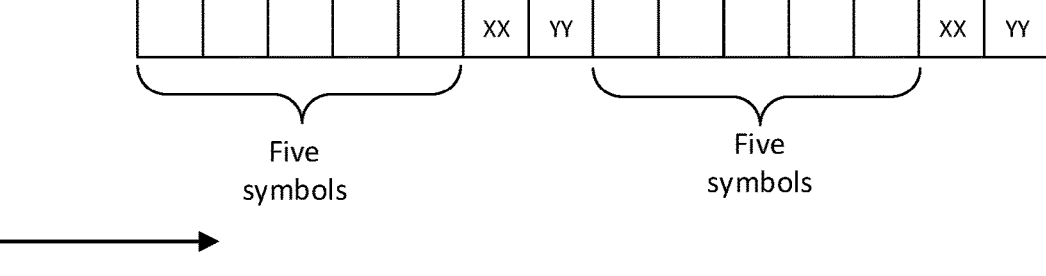
FIG. 11 is a schematic illustration of NB-IoT resource reservation excluding NRS in accordance with some embodiments.

According to some embodiments, the granularity of resource reservation is optimized to efficiently reserve resources. For example, a five-symbol granularity can be considered to reserved NB-IoT symbols that lie between NRS symbols within a subframe, as depicted in FIG. 11. As before, 'XX' indicates NRS from antenna port #0, and 'YY' indicates NRS from antenna port #1.

The overhead of time-domain resource reservation using two-level bitmap scheme (denoted as bitmap 1 and bitmap 2) is presented in Tables 1 and 2 below. In more detail, Table 1 lists the length of bitmaps for a bitmap-based LTE-M resource reservation that excludes CRS for two antenna ports, while Table 2 lists the length of bitmaps for a bitmap-based NB-IoT resource reservation that excludes NRS for two antenna ports.

The overhead of resource reservation may depend on the bitmap length which itself depends on the granularity. Table 1 and Table 2 list the length of bitmap 1 and bitmap 2 in some embodiments showing the two-level bitmap resource reservation methods described herein. Thus, by means of the methods proposed herein one may reduce the required number of bits compared to previous solutions.

TABLE 1

Bitmap length for various granularities of LTE-M resource reservation (two-level bitmap case).

| Granularity of resource reservation | Bitmap 1 length | Bitmap 2 length for each partially valid subframe |
|---|---|---|
| One OFDM symbol | 10 (within one frame), or 40 (within four frames) | 10 |
| Five OFDM symbols | 10 (within one frame), or 40 (within four frames) | 2 |
| Pairs of three-symbol and two-symbol | 10 (within one frame), or 40 (within four frames) | 4 |
| Subframe-level (14 OFDM symbols) | 10 (within one frame), or 40 (within four frames) | No need for bitmap 2 |

TABLE 2

Bitmap length for various granularities of NB-IoT resource reservation (two-level bitmap case).

| Granularity of resource reservation | Bitmap 1 length | Bitmap 2 length for each partially valid subframe |
|---|---|---|
| One OFDM symbol | 10 (within one frame), or 40 (within four frames) | 10 |
| Pairs of three-symbol and two-symbol | 10 (within one frame), or 40 (within four frames) | 4 |
| Subframe-level (14 OFDM symbols) | 10 (within one frame), or 40 (within four frames) | No need for bitmap 2 |

Several different embodiments for taking symbols containing reference signals into account in connection with resource reservation have been disclosed above. Some or all of them aim at reducing the signaling overhead for indicating the resource reservation. The embodiments may be used separately or in combination. The different embodiments may be implemented in different nodes in a communications network.

There is provided a method implemented in a network node, where the network node sends in a first step a first configuration message to a wireless device in which the resource reservation is configured according any of the embodiments described herein. The first configuration message may, for example, comprise at least one bitmap indicating the reserved resources. The bitmap may indicate reserved symbols within a subframe, where symbols that contain reference signals of one or more specific type have been excluded from the bitmap.

In an optional step, the network sends a second configuration message, where the second configuration message contains information about one or more types of reference signals for which the corresponding symbols have been excluded from the bitmap. The first and second configuration messages may be transmitted in any order. Alternatively, the first configuration message additionally contains the information about one or more types of reference signals for which the corresponding symbols have been excluded from the bitmap. In some embodiments, this information is conveyed implicitly by using a specific length of the bitmap, in accordance with example embodiments described for LTE-M and NB-IoT above.

Alternatively, or additionally, the information about one or more types of reference signals for which the corresponding symbols have been excluded from the bitmap may be determined by reference to rules or conditions in a standards document. This may, in some embodiments, be applied in cases where a particular length of the bitmap may be related to more than one type of reference signal or combination of reference signals, where the rules and conditions may provide further guidance on how to derive information on the types of reference signals to consider. Such rules and conditions may include other parameters related to the own system, or the system for which the resources are reserved. Some non-limiting examples of such parameters include a start symbol of a data or control region for LTE-M, a duplexing scheme (Frequency division duplex, FDD, or time division duplex, TDD), the number of CRS antenna ports, a system bandwidth, or MBSFN configurations.

The first and second configuration messages may be broadcasted to all wireless devices as part of system information transmission, and/or they may be transmitted as dedicated Radio Resource Control (RRC) messages directed to one or more specific wireless devices. In a subsequent step, the network node sends a transmission containing control or data to the wireless device, taking into account the reserved resources in accordance with the first and second configuration messages. There is furthermore provided a method implemented in a wireless device. The method in the wireless device mirrors the steps, or a subset of the steps described for the network node above.

Figure 12:
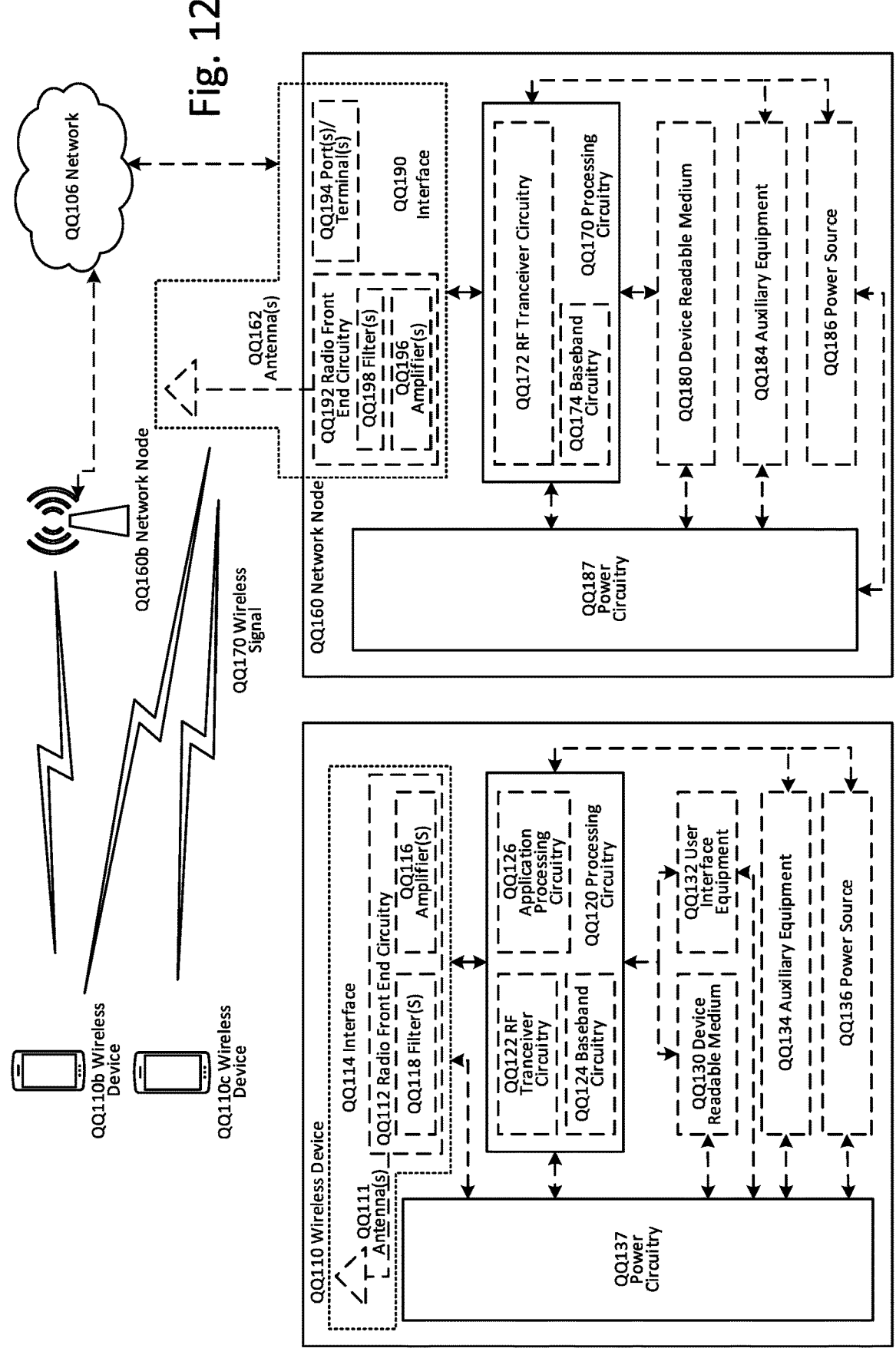
FIG. 12 is a schematic illustration of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG.

12 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Figure 13:
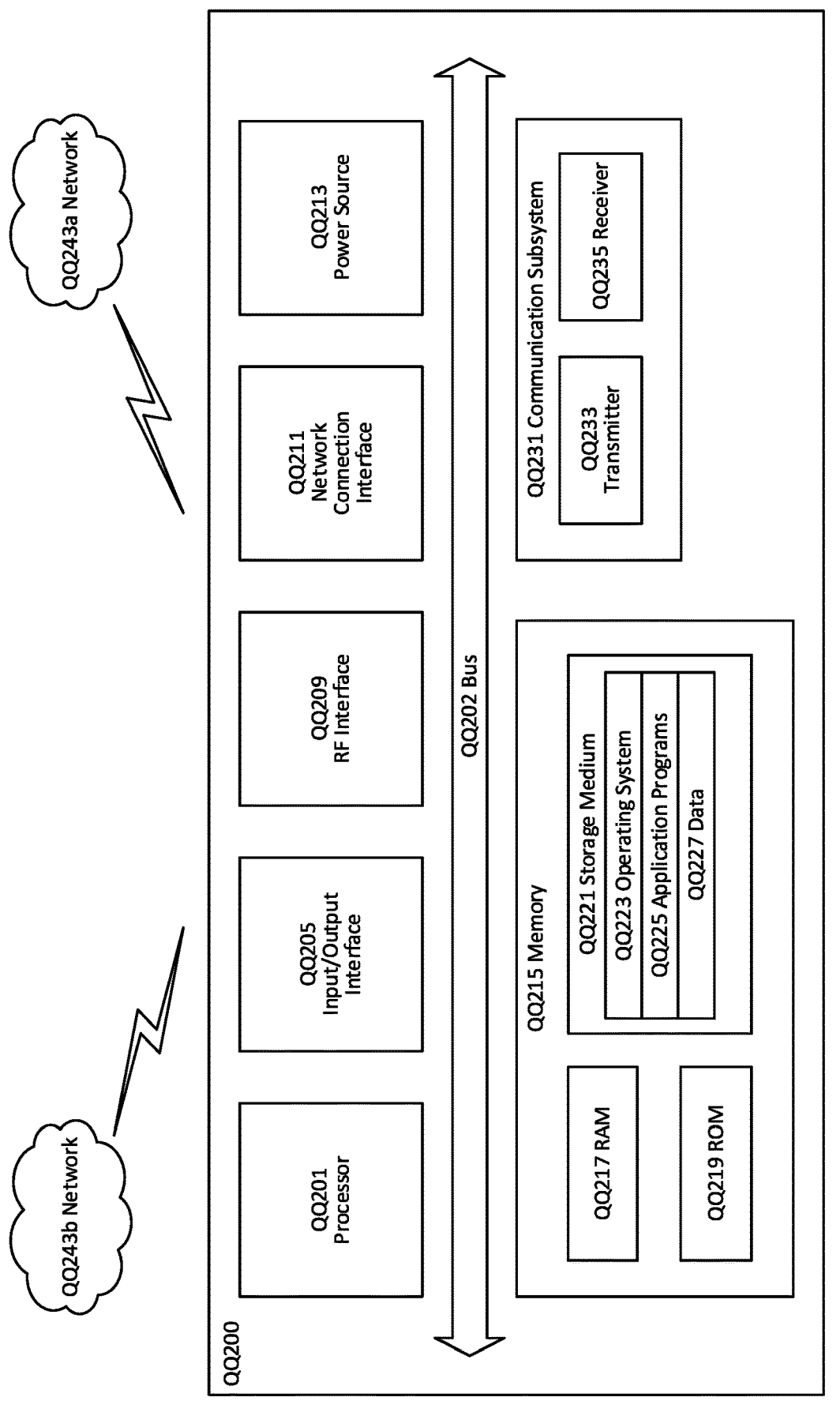
FIG. 13 is a schematic illustration of a user equipment.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied. FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 13, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 13, processing circuitry QQ201 may be configured to communicate with network QQ243*b* using communication subsystem QQ231. Network QQ243*a* and network QQ243*b* may be the same network or networks or different network or networks. Communication subsystem QQ231 may be configured to include one or more transceivers used to communicate with network QQ243*b*. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/ or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein.

Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

FIG. 14 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 14, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) 003100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in Figure QQ3. In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station. In some embodiments, some signalling can be effected with the use of control system QQ3230 which may alternatively be used for communication between the hardware nodes QQ330 and radio units QQ3200.

Figure 15:
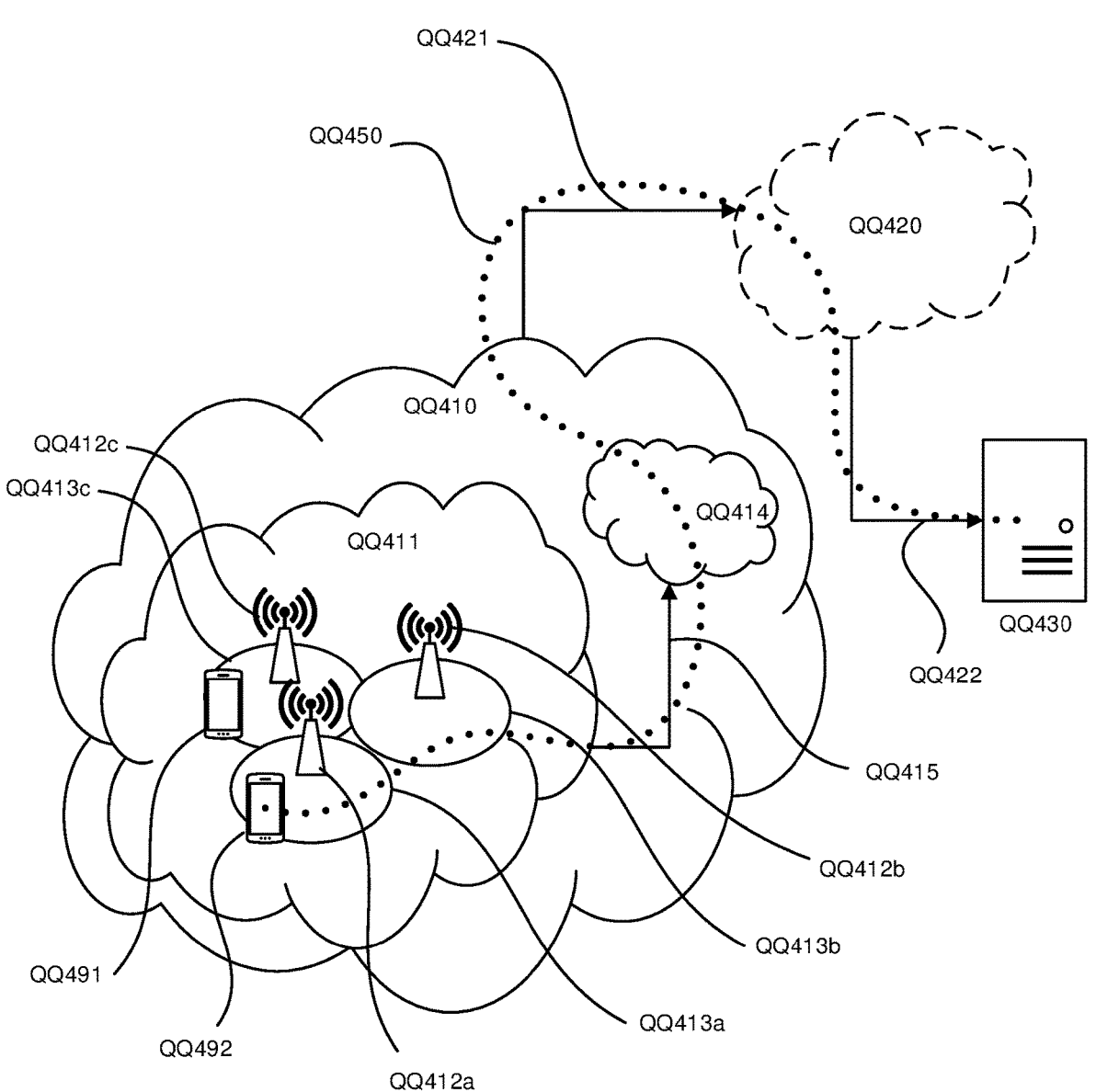
FIG. 15 schematically illustrates a telecommunication network connected via an intermediate network to a host computer.

With reference to FIG. 15, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 15 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 16. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 16) served by base station QQ520. Communication interface QQ526 may be configured to facilitate connection QQ560 to host computer QQ510. Connection QQ560 may be direct or it may pass through a core network (not shown in FIG. 16) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection. Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 16:
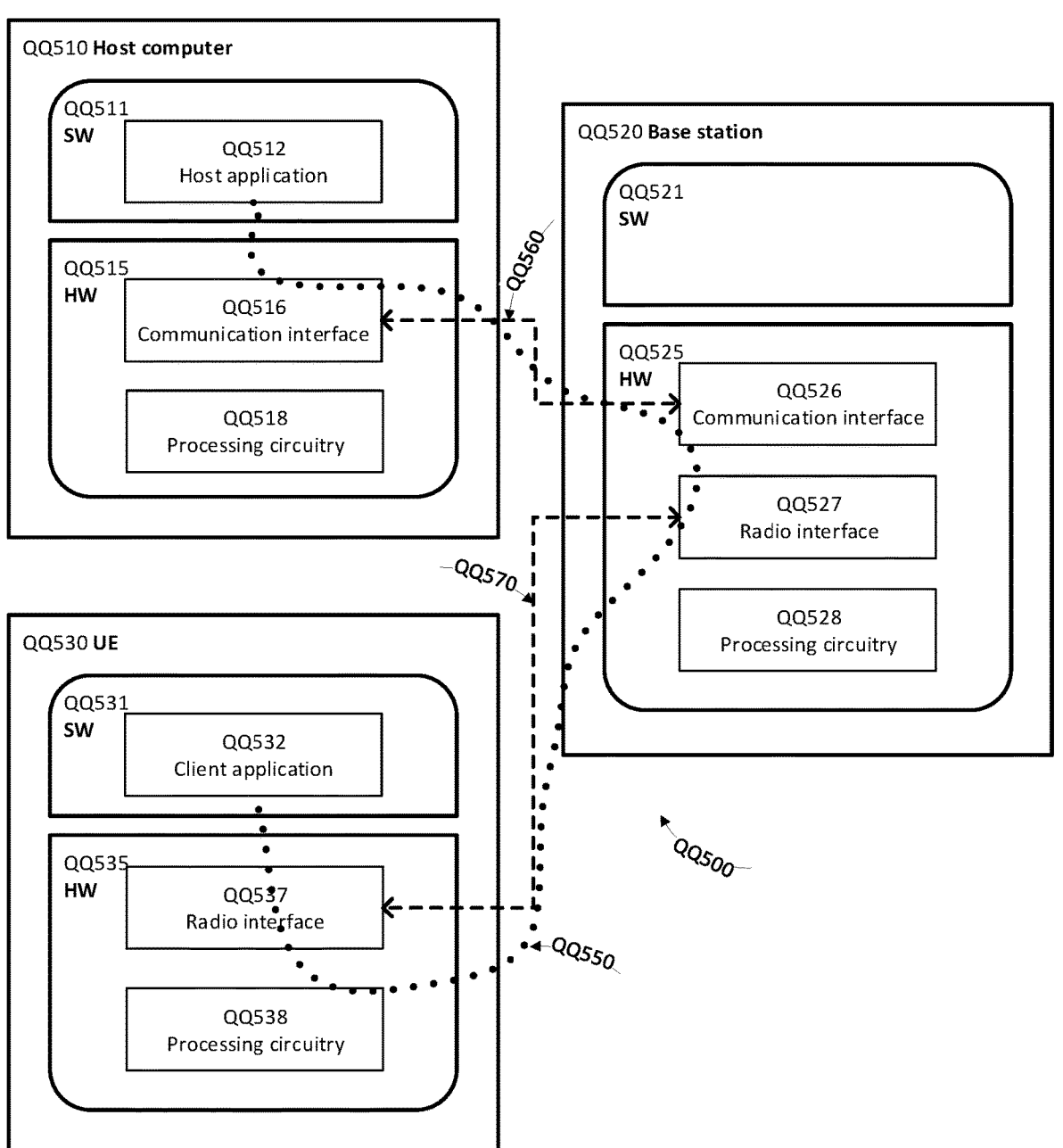
FIG. 16 is a generalized block diagram of a host computer communicating via a base station with a user equipment over a partially wireless connection.

It is noted that host computer QQ510, base station QQ520 and UE QQ530 illustrated in FIG. 16 may be similar or identical to host computer QQ430, one of base stations QQ412a, QQ412b, QQ412c and one of UEs QQ491, QQ492 of FIG. 15, respectively. This is to say, the inner workings of these entities may be as shown in FIG. 16 and independently, the surrounding network topology may be that of FIG. 15.

In FIG. 16, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the data rate and latency and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities.

The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figures 17, 18:
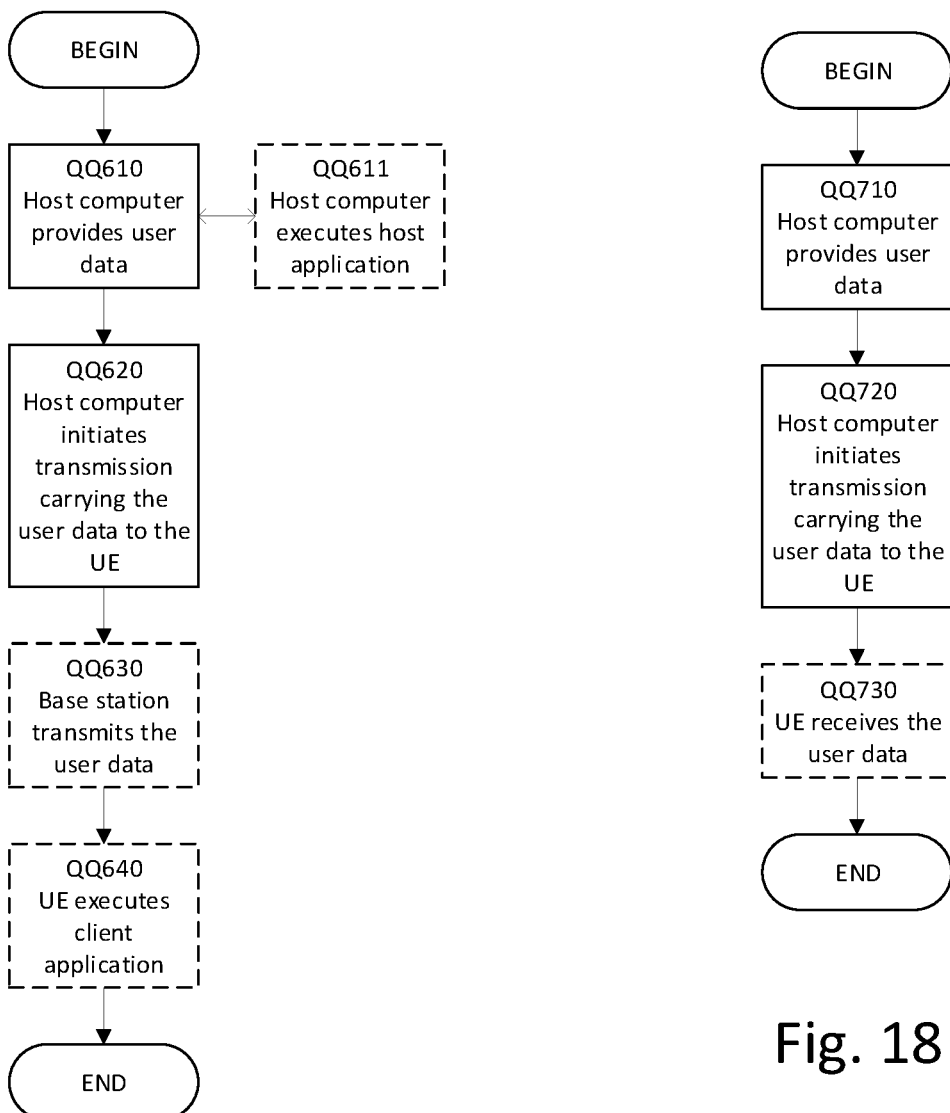
FIGS. 17-20 are flowcharts illustrating methods implemented in a communication system including a host computer, a base station and a user equipment.

FIG. 17 is a flowchart illustrating a method implemented in a communication system, in accordance with one embodiment. The communication system includes a host computer, a base station and a UE which may be those described with reference to FIGS. 15 and 10. For simplicity of the present disclosure, only drawing references to FIG. 17 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 18 is a flowchart illustrating a method implemented in a communication system, in accordance with one embodiment. The communication system includes a host computer, a base station and a UE which may be those described with reference to FIGS. 15 and 10. For simplicity of the present disclosure, only drawing references to FIG. 18 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figures 19, 20:
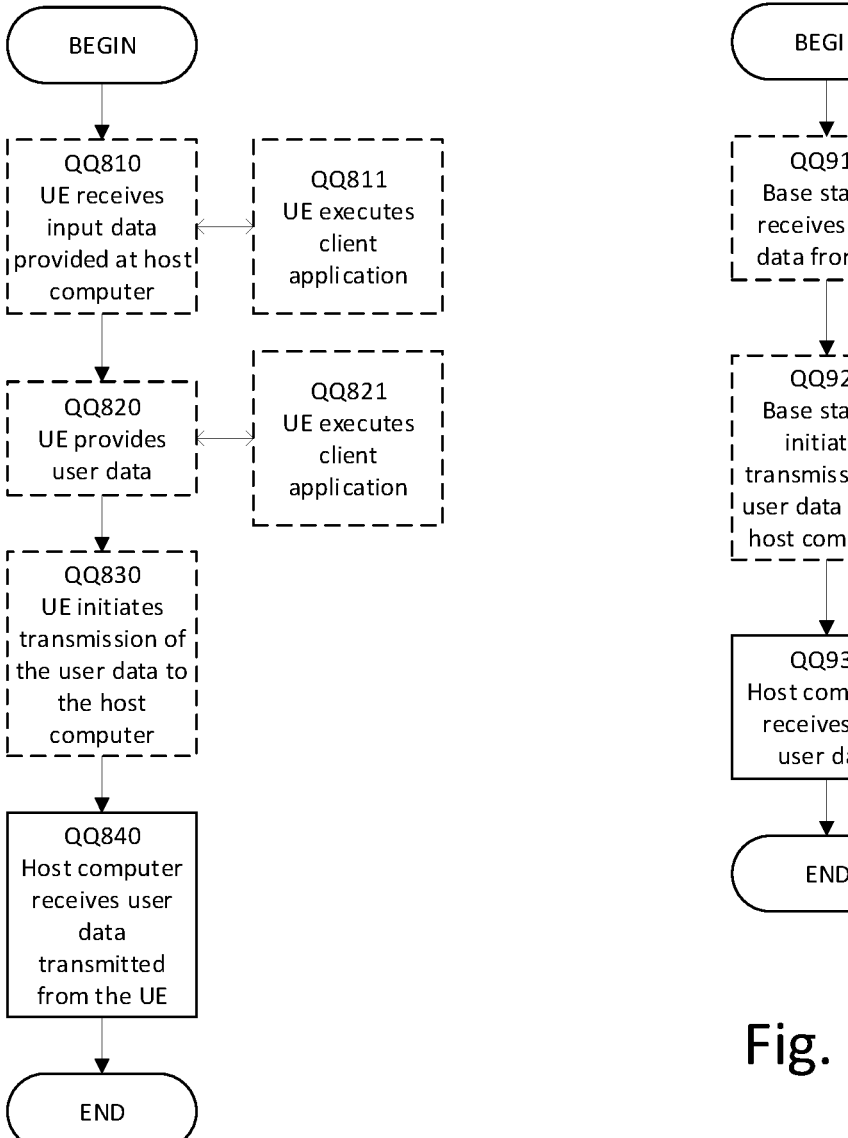

FIG. 19 is a flowchart illustrating a method implemented in a communication system, in accordance with one embodiment. The communication system includes a host computer, a base station and a UE which may be those described with reference to FIGS. 15 and 10. For simplicity of the present disclosure, only drawing references to FIG. 19 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station and a UE which may be those described with reference to FIGS. 15 and 10. For simplicity of the present disclosure, only drawing references to FIG. 20 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| 3GPP | 3rd Generation Partnership Project |
| BCCH | Broadcast Control Channel |
| BCH | Broadcast Channel |
| CORESET | Control Resource Set |
| CRS | Cell-specific Reference Signal |
| CSI-RS | Channel State Information Reference Signal |
| DCCH | Dedicated Control Channel |
| DL | Downlink |
| DMRS | Demodulation Reference Signal |
| eNB | Evolved Node B |
| IoT | Internet of Things |
| LTE | Long-Term Evolution |
| LTE-M | Long-Term Evolution for Machine-Type Communications |
| LTE-MTC | Long-Term Evolution for Machine-Type Communications |
| MBSFN | Multicast Service Single Frequency Network |
| NB-IoT | Narrowband Internet of Things |
| NR | New Radio |
| NRS | Narrowband Reference Signal |
| NSSS | Narrowband Secondary Synchronization Signal |
| OFDM | Orthogonal Frequency Division Multiplexing |
| PBCH | Physical Broadcast Channel |
| PDCCH | Physical Downlink Control Channel |
| PDSCH | Physical Downlink Shared Channel |
| PRB | Physical Resource Block |
| PSS | Primary Synchronization Signal |
| PUCCH | Physical Uplink Control Channel |
| PUSCH | Physical Uplink Shared Channel |
| RRC | Radio Resource Control |
| SSB | Synchronization Signal Block |
| SSS | Secondary Synchronization Signal |
| TDD | Time Division Duplex |
| TRS | Tracking Reference Signal |
| UE | User Equipment |
| UL | Uplink |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A network node for handling communication of wireless devices in a wireless communication network, the network node comprising processing circuitry configured to:
    send a first configuration message to a wireless device, wherein the first configuration message comprises a resource reservation scheme;
    wherein the resource reservation scheme comprises at least one bitmap indicating at least one reserved resource, wherein the at least one bitmap indicates reserved resources within a subframe, and wherein resources carrying a predefined reference signal have been excluded from the bitmap, such that the at least one bitmap does not indicate whether the resources carrying the predefined reference signal are reserved resources;
    wherein the predefined reference signal is at least one of a Demodulation Reference Signal, DMRS, a Cell-specific Reference Signal, CRS, and a Narrowband Reference Signal, NRS; and
    wherein the resource reservation scheme comprises a two-level bitmap indicating the at least one reserved resource.

2. The network node of claim 1, wherein the processing circuitry is further configured to:
    send a transmission comprising control or data to the wireless device based on the at least one reserved resource.

3. The network node of claim 1, wherein a first level of the two-level bitmap indicates a subset of subframes of the bitmap, and a second level of the two-level bitmap indicates any reserved Orthogonal Frequency-Division Multiplexing, OFDM, symbol(s) within a subframe of the subset of subframes.

4. The network node of claim 1, wherein the two-level bitmap indicates at least one reserved Orthogonal Frequency-Division Multiplexing, OFDM, symbol within a subframe of the bitmap, wherein any OFDM symbol carrying a Narrowband Reference Signal, NRS, is excluded from the bitmap.

5. The network node of claim 1, wherein the two-level bitmap indicates at least one reserved Orthogonal Frequency-Division Multiplexing, OFDM, symbol within a subframe of the bitmap, wherein any OFDM symbol carrying a Demodulation Reference Signal, DMRS, is excluded from the bitmap.

6. The network node of claim 1, wherein the two-level bitmap indicates at least one reserved Orthogonal Frequency-Division Multiplexing, OFDM, symbol within a subframe of the bitmap, wherein any OFDM symbol carrying a Cell-specific Reference Signal, CRS, is excluded from the bitmap.

7. The network node of claim 1, wherein the two-level bitmap indicates at least one reserved Orthogonal Frequency-Division Multiplexing, OFDM, symbol within the subframe, and
    wherein the resource reservation scheme is based on a pattern of OFDM symbols carrying Narrowband Reference Signals, NRSs, within the subframe such that the indicated at least one reserved resource is based on any remaining OFDM symbols that are not carrying NRSs.

8. The network node of claim 1, wherein the two-level bitmap indicates at least one reserved Orthogonal Frequency-Division Multiplexing, OFDM, symbol within the subframe, and
    wherein the resource reservation scheme is based on a pattern of OFDM symbols carrying Demodulation Reference Signals, DMRSs, and OFDM symbols carrying Cell-specific Reference Signals, CRSs, within the subframe such that the indicated at least one reserved resource is based on any remaining OFDM symbols that are not carrying DMRSs or CRSs.

9. The network node of claim 1, wherein a granularity of the resource reservation scheme is a one Orthogonal Frequency-Division Multiplexing, OFDM, symbol granularity.

10. The network node of claim 1, wherein a resource indicated as a reserved resource is not used for transmission from the network node to the wireless device; and
    wherein a resource not indicated as a reserved resource is allowable to be used for transmission from the network node to the wireless device.

11. A method performed by a network node for handling communication of wireless devices in a wireless communication network, the method comprising:
    sending a first configuration message to a wireless device, wherein the first configuration message comprises a resource reservation scheme;
    wherein the resource reservation scheme comprises at least one bitmap indicating at least one reserved resource, wherein the at least one bitmap indicates reserved resources within a subframe, and wherein resources carrying a predefined reference signal have been excluded from the bitmap, such that the at least one bitmap does not indicate whether the resources carrying the predefined reference signal are reserved resources;

wherein the predefined reference signal is at least one of a Demodulation Reference Signal, DMRS, a Cell-specific Reference Signal, CRS, and a Narrowband Reference Signal, NRS; and wherein the resource reservation scheme comprises a two-level bitmap indicating the at least one reserved resource.

12. A wireless device for communicating with a network node in a wireless communication network, the wireless device comprising processing circuitry configured to:

receive a first configuration message from the network node, the configuration message comprising a resource reservation scheme indicating at least one reserved resource;

use, based on the received first configuration message, one or more radio resources for communicating in the wireless communication network;

wherein the resource reservation scheme comprises at least one bitmap indicating the at least one reserved resource, wherein the at least one bitmap indicates reserved resources within a subframe, and wherein resources carrying a predefined reference signal have been excluded from the bitmap, such that the at least one bitmap does not indicate whether the resources carrying the predefined reference signal are reserved resources;

wherein the predefined reference signal is at least one of a Demodulation Reference Signal, DMRS, a Cell-specific Reference Signal, CRS, and a Narrowband Reference Signal, NRS; and wherein the resource reservation scheme comprises a two-level bitmap indicating the at least one reserved resource.

13. The wireless device of claim 12, wherein a first level of the two-level bitmap indicates a subset of subframes of the bitmap, and a second level of the two-level bitmap indicates any reserved Orthogonal Frequency-Division Multiplexing, OFDM, symbol(s) within a subframe of the subset of subframes.

14. The wireless device of claim 12, wherein the two-level bitmap indicates at least one reserved Orthogonal Frequency-Division Multiplexing, OFDM, symbol within a subframe of the bitmap, wherein any OFDM symbol carrying a Narrowband Reference Signal, NRS, is excluded from the bitmap.

15. The wireless device of claim 12, wherein the two-level bitmap indicates at least one reserved Orthogonal Frequency-Division Multiplexing, OFDM, symbol within a subframe of the bitmap, wherein any OFDM symbol carrying a Demodulation Reference Signal, DMRS, is excluded from the bitmap.

16. The wireless device of claim 12, wherein the two-level bitmap indicates at least one reserved Orthogonal Frequency-Division Multiplexing, OFDM, symbol within a subframe of the bitmap, wherein any OFDM symbol carrying a Cell-specific Reference Signal, CRS, is excluded from the bitmap.

17. The wireless device of claim 12, wherein the two-level bitmap indicates at least one reserved Orthogonal Frequency-Division Multiplexing, OFDM, symbol within the subframe, and wherein the resource reservation scheme is based on a pattern of OFDM symbols carrying Narrowband Reference Signals, NRSs, within the subframe such that the indicated at least one reserved resource is based on any remaining OFDM symbols that are not carrying NRSs.

18. The wireless device of claim 12, wherein the two-level bitmap indicates at least one reserved Orthogonal Frequency-Division Multiplexing, OFDM, symbol within the subframe, and wherein the resource reservation scheme is based on a pattern of OFDM symbols carrying Demodulation Reference Signals, DMRSs, and OFDM symbols carrying Cell-specific Reference Signals, CRSs, within the subframe such that the indicated at least one reserved resource is based on any remaining OFDM symbols that are not carrying DMRSs or CRSs.

19. The wireless device of claim 12, wherein a granularity of the resource reservation scheme is a one Orthogonal Frequency-Division Multiplexing, OFDM, symbol granularity.

20. The wireless device of claim 12, wherein the processing circuitry is further configured to:

receive a transmission comprising control or data from the network node based on the at least one indicated reserved resource.

21. The wireless device of claim 12, wherein a resource indicated as a reserved resource is not used for transmission from the wireless device to the network node; and wherein a resource not indicated as a reserved resource is allowable to be used for transmission from the wireless device to the network node.

22. A method performed by a wireless device for communication with a network node in a wireless communication network, the method comprising:

receiving a first configuration message from the network node, the configuration message comprising a resource reservation scheme indicating at least one reserved resource; and using, based on the received first configuration message, one or more radio resources for communicating in the wireless communication network;

wherein the resource reservation scheme comprises at least one bitmap indicating the at least one reserved resource, wherein the at least one bitmap indicates reserved resources within a subframe, and wherein resources carrying a predefined reference signal have been excluded from the bitmap, such that the at least one bitmap does not indicate whether the resources carrying the predefined reference signal are reserved resources;

wherein the predefined reference signal is at least one of a Demodulation Reference Signal, DMRS, a Cell-specific Reference Signal, CRS, and a Narrowband Reference Signal, NRS; and wherein the resource reservation scheme comprises a two-level bitmap indicating the at least one reserved resource.

* * * * *